US010951258B2

(12) United States Patent
Furukawa

(10) Patent No.: US 10,951,258 B2
(45) Date of Patent: Mar. 16, 2021

(54) WAVEGUIDE UNIT, WAVEGUIDE DEVICE, AND CONNECTION METHOD

(71) Applicant: NEC Corporation, Tokyo (JP)

(72) Inventor: Eiichi Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/631,541

(22) PCT Filed: Jun. 28, 2018

(86) PCT No.: PCT/JP2018/024552
§ 371 (c)(1),
(2) Date: Jan. 16, 2020

(87) PCT Pub. No.: WO2019/017177
PCT Pub. Date: Jan. 24, 2019

(65) Prior Publication Data
US 2020/0177228 A1 Jun. 4, 2020

(30) Foreign Application Priority Data
Jul. 21, 2017 (JP) .............................. JP2017-141915

(51) Int. Cl.
*H04B 1/52* (2015.01)
*H04B 1/56* (2006.01)
*H01P 1/213* (2006.01)

(52) U.S. Cl.
CPC ............... *H04B 1/52* (2013.01); *H01P 1/213* (2013.01); *H04B 1/56* (2013.01)

(58) Field of Classification Search
CPC .............. H04B 1/52; H04B 1/56; H01P 1/213
(Continued)

(56) References Cited

U.S. PATENT DOCUMENTS

| 4,449,128 A | 5/1984 | Weir |
| 5,212,813 A | 5/1993 | Renaud |

(Continued)

FOREIGN PATENT DOCUMENTS

| FR | 2 658 967 A1 | 8/1991 |
| JP | 2006-311072 A | 11/2006 |
| JP | 2010-268041 A | 11/2010 |

OTHER PUBLICATIONS

International Search Report of PCT/JP2018/024522 dated Sep. 18, 2018.

*Primary Examiner* — Lee Nguyen
(74) *Attorney, Agent, or Firm* — Sughrue Mion, PLLC

(57) ABSTRACT

A waveguide unit includes an interface unit configured to receive a transmission radio wave $fl_{TX1}$ output from a transmission/reception processing unit, and output a reception radio wave $fl_{RX1}$ to the transmission/reception processing unit. Further, the waveguide unit includes a transmission wave input port, a transmission wave output port, a reception wave input port, and a reception wave output port. Further, the waveguide unit includes a reception band-pass filter configured to pass the reception radio wave $fl_{RX1}$ of a multiplex reception radio wave input to the reception wave input port and output the reception radio wave $fl_{RX1}$ toward the interface unit, and, on the other hand, reflect a reception radio wave $fl_{RX2}$ and output the reception radio wave $fl_{RX2}$ toward the reception wave output port.

15 Claims, 13 Drawing Sheets

(58) Field of Classification Search
USPC .......................................................... 455/73
See application file for complete search history.

(56) References Cited

U.S. PATENT DOCUMENTS 7,904,027 B2 * 3/2011 Onoda .................... H04B 1/52
455/73
2006/0246850 A1 11/2006 Onoda

* cited by examiner

WAVEGUIDE UNIT, WAVEGUIDE DEVICE, AND CONNECTION METHOD

CROSS REFERENCE TO RELATED APPLICATIONS

This application is a National Stage of International Application No. PCT/JP2018/024552 filed Jun. 28, 2018, claiming priority based on Japanese Patent Application No. 2017-141915 filed Jul. 21, 2017, the disclosures of which are incorporated herein in their entirety by reference.

TECHNICAL FIELD

The present invention relates to a waveguide unit, a waveguide device, and a connection method.

BACKGROUND ART

A wave divider (namely, a waveguide device) for sharing one transmission/reception antenna among a plurality of transmission/reception integrated-type radio sets (namely, transmission/reception processing units) has been proposed (for example, Patent Literature 1).

On the other hand, in recent years, a mobile terminal having a high transmission capacity rapidly becomes widespread, and mobile data communication traffic sharply increases. Due to the sharp increase in mobile data communication traffic, an outdoor installation-type microwave radio transmission/reception device using a high radio frequency also requires high reliability, high functionality, a large capacity, and the like. Thus, flexibility is also expected from the outdoor installation-type microwave radio transmission/reception device in such a way as to be able to increase a transmission capacity in capacity at a low cost with a minimum configuration according to a communication environment and communication traffic.

However, in a waveguide device disclosed in Patent Literature 1 described above, the number of connectable transmission/reception units is up to four, and addition of a transmission/reception processing unit is not taken into consideration. In other words, the waveguide device disclosed in Patent Literature 1 described above has poor flexibility and efficiency of adding a transmission/reception processing unit.

In contrast, a shared circuit (namely, a waveguide unit) that allows addition of one transmission/reception processing unit at a time has been proposed (for example, Patent Literature 2).

CITATION LIST

Patent Literature

[Patent Literature 1] Japanese Unexamined Patent Application Publication No. 2006-311072
[Patent Literature 2] Japanese Unexamined Patent Application Publication No. 2010-268041

SUMMARY OF INVENTION

Technical Problem

However, a transmission wave path and a reception wave path are a common path in a waveguide unit disclosed in Patent Literature 2 described above. Thus, the waveguide unit has a configuration in which the number of elements such as a circulator on a path in a waveguide device including a plurality of coupled waveguide units is increased when the number of coupling of waveguide units is increased. A loss and a delay in the transmission wave path and the reception wave path may increase due to the configuration.

An object of the present invention is to provide a waveguide unit, a waveguide device, and a connection method, being capable of improving flexibility and efficiency of adding a transmission/reception processing unit, and also reducing a loss and a delay in a transmission wave path and a reception wave path.

Solution to Problem

A waveguide unit according to a first aspect of the present invention configured to be connectable to each of a transmission/reception processing unit being a first connected object unit, a second connected object unit, and a third connected object unit, the waveguide unit including: a first interface unit configured to receive a first transmission radio wave having a first transmission frequency being output from the transmission/reception processing unit, and output a first reception radio wave having a first reception frequency to the transmission/reception processing unit; a first transmission wave input port configured to receive a second transmission radio wave having a second transmission frequency being output from the third connected object unit when the third connected object unit is another waveguide unit; a first transmission wave output port configured to output the first transmission radio wave and the second transmission radio wave to the second connected object unit; a first reception wave input port configured to receive a multiplex reception radio wave from the second connected object unit; a first reception wave output port configured to output a second reception radio wave having a second reception frequency included in the multiplex reception radio wave to the third connected object unit; and a first reception band-pass filter configured to pass the first reception radio wave of the multiplex reception radio wave being input to the first reception wave input port and output the first reception radio wave toward the first interface unit, and reflect the second reception radio wave and output the second reception radio wave toward the first reception wave output port.

A waveguide device according to a second aspect of the present invention used by being connected to an antenna, the waveguide device including a second waveguide unit configured to be connectable to a second transmission/reception processing unit, and a first waveguide unit configured to be connectable to a first transmission/reception processing unit and connected to the second waveguide unit and a connected object unit. The first waveguide unit includes: a first interface unit configured to receive a first transmission radio wave having a first transmission frequency being output from the first transmission/reception processing unit, and output a first reception radio wave having a first reception frequency to the first transmission/reception processing unit; a first transmission wave input port configured to receive a second transmission radio wave having a second transmission frequency being output from the second waveguide unit; a first transmission wave output port configured to output a multiplex transmission radio wave of the first transmission radio wave and the second transmission radio wave to the connected object unit; a first reception wave input port configured to receive a multiplex reception radio wave being received by the antenna from the connected object unit; a first reception wave output port configured to output a second reception radio wave having a second reception frequency included in the multiplex reception radio wave to the second waveguide unit; and a first reception band-pass filter configured to pass the first reception radio wave of the multiplex reception radio wave being input to the first reception wave input port and output the first reception radio wave toward the first interface unit, and reflect the second reception radio wave and output the second reception radio wave toward the first reception wave output port.

A connection method according to a third aspect of the present invention is a connection method of a plurality of waveguide units in a first waveguide device used by being connected to a first antenna and a second waveguide device used by being connected to a second antenna disposed in such a way as to be opposed to the first antenna. The first waveguide device includes a second waveguide unit configured to be connectable to a second transmission/reception processing unit, and a first waveguide unit configured to be connectable to a first transmission/reception processing unit and connected to the second waveguide unit and a connected object unit. The first waveguide unit includes a first interface unit configured to receive a first transmission radio wave having a first transmission frequency being output from the first transmission/reception processing unit, and output a first reception radio wave having a first reception frequency to the first transmission/reception processing unit, a first transmission wave input port configured to receive a second transmission radio wave having a second transmission frequency being output from the second waveguide unit, a first transmission wave output port configured to output a multiplex transmission radio wave of the first transmission radio wave and the second transmission radio wave to the connected object unit, a first reception wave input port configured to receive a multiplex reception radio wave being received by the first antenna from the connected object unit, a first reception wave output port configured to output a second reception radio wave having a second reception frequency included in the multiplex reception radio wave to the second waveguide unit, a first waveguide configured to connect the first transmission wave input port to the first transmission wave output port, a second waveguide configured to dispose away from the first waveguide that connects the first reception wave input port to the first reception wave output port, and a first reception band-pass filter configured to pass the first reception radio wave of the multiplex reception radio wave being input to the first reception wave input port and output the first reception radio wave toward the first interface unit, and, on the other hand, reflect the second reception radio wave and output the second reception radio wave toward the first reception wave output port. The second waveguide device includes a third waveguide unit configured to be connectable to a third transmission/reception processing unit being a communication partner of the first transmission/reception processing unit, and a fourth waveguide unit configured to be connectable to a fourth transmission/reception processing unit being a communication partner of the second transmission/reception processing unit. In the first waveguide device, the first waveguide unit and the second waveguide unit are connected in series in order of the first waveguide unit and the second waveguide unit in order closer to the first antenna side. In the second waveguide device, the third waveguide unit and the fourth waveguide unit are connected in series in order of the fourth waveguide unit and the third waveguide unit in order closer to the second antenna side.

Advantageous Effects of Invention

The present invention is able to provide a waveguide unit, a waveguide device, and a connection method, being capable of improving flexibility and efficiency of adding a transmission/reception processing unit, and also reducing a loss and a delay in a transmission wave path and a reception wave path.

DESCRIPTION OF EMBODIMENTS

Example embodiments will be described below with reference to the drawings. Note that an identical or similar element is provided with an identical reference sign, and overlapping description is omitted.

First Example Embodiment

<Configuration Example of Waveguide Unit>

Figure 1:
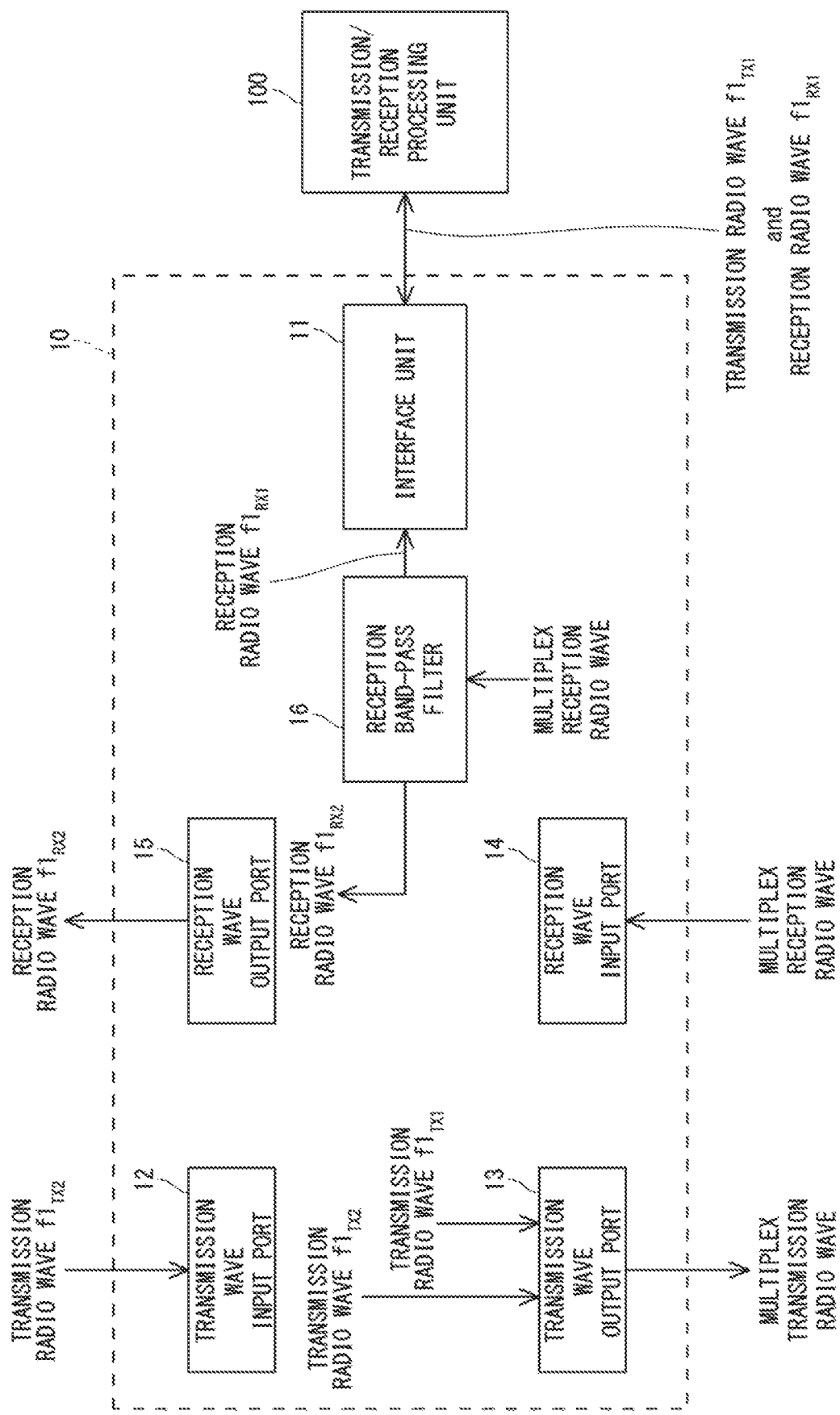
FIG. 1 is a diagram illustrating one example of a waveguide unit according to a first example embodiment.

FIG. 1 is a diagram illustrating one example of a waveguide unit according to a first example embodiment. A waveguide unit 10 illustrated in FIG. 1 is configured to be connectable to each of a transmission/reception processing unit 100 being a "first connected object unit", a second connected object unit (not illustrated), and a third connected object unit (not illustrated). Hereinafter, description is given on the assumption that the third connection unit is another waveguide unit. Then, the third connection unit is configured to be connectable to another transmission/reception processing unit having a transmission frequency and a reception frequency different from those of the transmission/reception processing unit 100, and has the same configuration as that of the waveguide unit 10.

In FIG. 1, the waveguide unit 10 includes an interface unit (first interface unit) 11, a transmission wave input port (first transmission wave input port) 12, a transmission wave output port (first transmission wave output port) 13, a reception wave input port (first reception wave input port) 14, a reception wave output port (first reception wave output port) 15, and a reception band-pass filter (first reception band-pass filter) 16. In the waveguide unit 10, the transmission wave input port 12, the transmission wave output port 13, the reception wave input port 14, and the reception wave output port 15 are disposed away from each other. In other words, the transmission wave input port 12, the transmission wave output port 13, the reception wave input port 14, and the reception wave output port 15 are separated from each other.

The interface unit 11 receives a transmission radio wave $f1_{TX1}$ having a transmission frequency $f1_{TX1}$ output from the transmission/reception processing unit 100, and outputs a reception radio wave $f1_{RX1}$ having a reception frequency $f1_{RX1}$ to the transmission/reception processing unit 100. Herein, the transmission/reception processing unit 100 may be referred to as an outdoor unit (ODU).

The transmission wave input port 12 receives a transmission radio wave $f1_{TX2}$ having a transmission frequency $f1_{TX2}$ output from the third connected object unit.

The transmission wave output port 13 outputs, to the second connected object unit, the transmission radio wave $f1_{TX1}$ input to the interface unit 11 and the transmission radio wave $f1_{TX2}$ input to the transmission wave input port 12 (namely, a multiplex transmission radio wave).

The reception wave input port 14 receives a multiplex reception radio wave from the second connected object unit.

The reception wave output port 15 outputs, to the third connected object unit, a reception radio wave $f1_{RX2}$ having a reception frequency $f1_{RX2}$ included in the multiplex reception radio wave input to the reception wave input port 14.

The reception band-pass filter 16 passes the reception radio wave $f1_{RX1}$ of the multiplex reception radio wave input to the reception wave input port 14, and outputs the reception radio wave $f1_{RX1}$ toward the interface unit 11. On the other hand, the reception band-pass filter 16 reflects the reception radio wave $f1_{RX2}$, and outputs the reception radio wave $f1_{RX2}$ toward the reception wave output port 15.

As described above, the waveguide unit 10 according to the first example embodiment is configured to be connectable in series with the third connection unit (another waveguide unit), and allows addition of one transmission/reception processing unit at a time. In other words, the waveguide unit 10 according to the first example embodiment can improve flexibility and efficiency of adding a transmission/reception processing unit. Furthermore, according to the waveguide unit 10 in the first example embodiment, since the transmission wave input port 12, the transmission wave output port 13, the reception wave input port 14, and the reception wave output port 15 are separated from each other, a transmission wave path and a reception wave path can be independent of each other. Thus, even when the number of coupling of waveguide units is increased, the number of elements such as a circulator provided in each of the transmission wave path and the reception wave path can be reduced further than that in a configuration in which the transmission wave path and the reception wave path are a common path. In this way, a loss and a delay in each of the transmission wave path and the reception wave path can be reduced.

Second Example Embodiment

A second example embodiment relates to a more specific configuration of a waveguide unit as compared with the first example embodiment.

<Configuration Example of Waveguide Unit>

Figure 2:
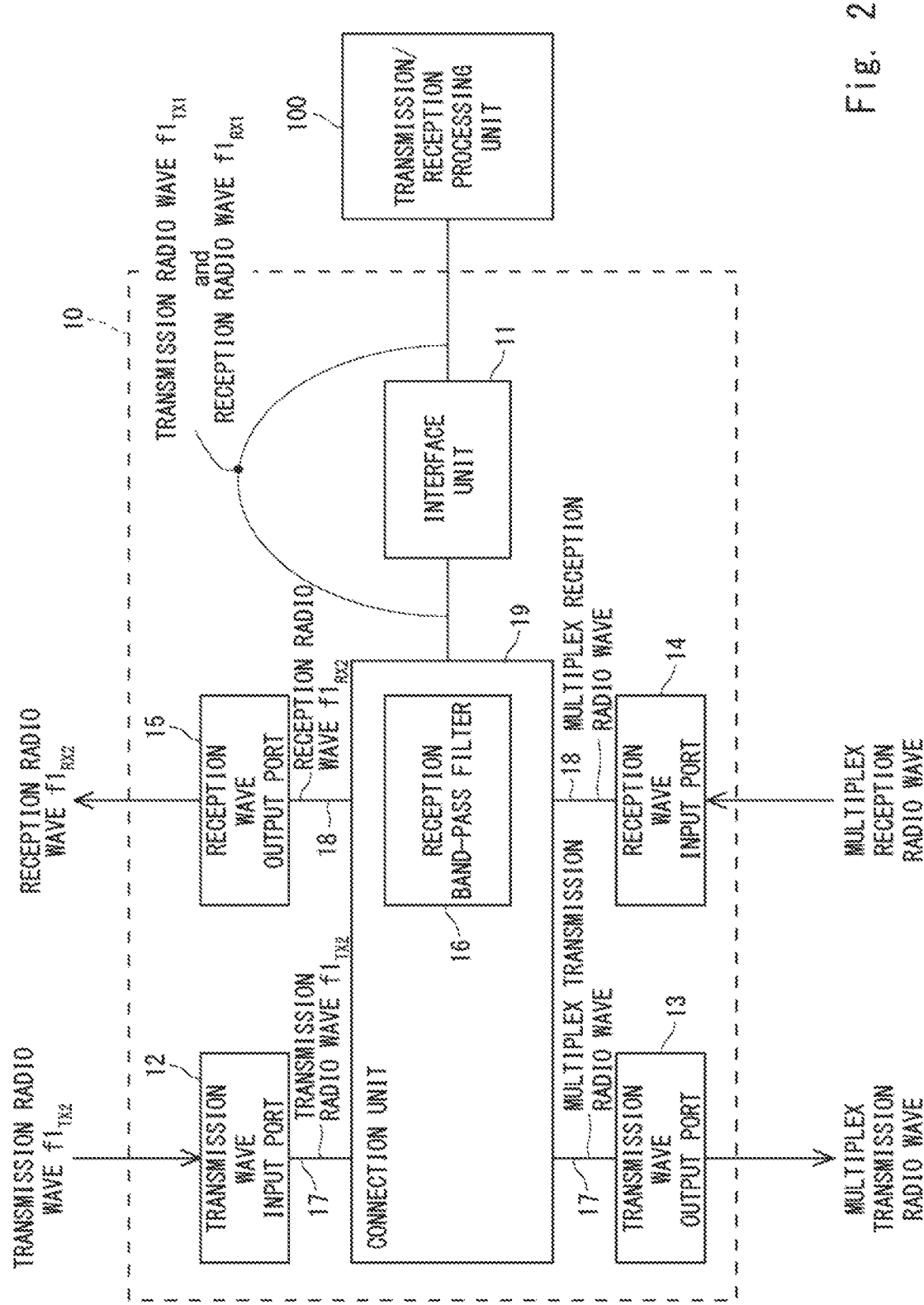
FIG. 2 is a diagram illustrating one example of a waveguide unit according to a second example embodiment.

FIG. 2 is a diagram illustrating one example of the waveguide unit according to the second example embodiment. In FIG. 2, a waveguide unit 10 according to the second example embodiment further includes a waveguide (first waveguide, transmission wave waveguide) 17, a waveguide (second waveguide, reception wave waveguide) 18, and a connection unit 19. The waveguide 17 and the waveguide 18 are disposed away from each other. In other words, the waveguide 17 and the waveguide 18 are separated from each other.

The waveguide 17 connects a transmission wave input port 12 to a transmission wave output port 13 via the connection unit 19. Further, the waveguide 18 connects a reception wave input port 14 to a reception wave output port 15 via the connection unit 19.

The connection unit 19 is interposed between the transmission wave input port 12 and the transmission wave output port 13 and between the reception wave input port 14 and the reception wave output port 15 in an intermediate portion of the waveguide 17 and an intermediate portion of the waveguide 18, respectively, and connects each of the intermediate portion of the waveguide 17 and the intermediate portion of the waveguide 18 to the interface unit 11. Further, the connection unit 19 includes a reception band-pass filter 16 that reflects a multiplex reception radio wave input to the reception wave input port 14 except for a reception radio wave $f1_{RX1}$, and, on the other hand, passes the reception radio wave $f1_{RX1}$.

The connection unit 19 outputs, to the waveguide 17 toward the transmission wave output port 13, a multiplex transmission radio wave acquired by multiplexing a transmission radio wave $f1_{TX1}$ input to the interface unit 11 and a transmission radio wave $f1_{TX2}$ input to the transmission wave input port 12. Furthermore, the connection unit 19 outputs the reception radio wave $f1_{RX1}$ passed through the reception band-pass filter 16 toward the interface unit 11, and also outputs the reception radio wave fl$_{RX2}$ reflected by the reception band-pass filter 16 to the waveguide 18 toward the reception wave output port 15.

As described above, the waveguide unit 10 according to the second example embodiment is configured to be connectable in series with a third connection unit (another waveguide unit), and allows addition of one transmission/reception processing unit at a time. In other words, the waveguide unit 10 according to the second example embodiment can improve flexibility and efficiency of adding a transmission/reception processing unit. Furthermore, according to the waveguide unit 10 in the second example embodiment, the waveguide (transmission wave path) 17 and the waveguide (reception wave path) 18 are independent of each other. Thus, even when the number of coupling of waveguide units is increased, the number of elements such as a circulator provided in each of the transmission wave path and the reception wave path can be reduced further than that in a configuration in which the transmission wave path and the reception wave path are a common path. In this way, a loss and a delay in each of the transmission wave path and the reception wave path can be reduced.

Third Example Embodiment

A third example embodiment relates to a more specific configuration of a waveguide unit. Further, the third example embodiment relates to a waveguide device including the waveguide unit and a transmission/reception device including the waveguide device.

<Configuration Example of Transmission/Reception Device and Waveguide Device>

Figure 3:
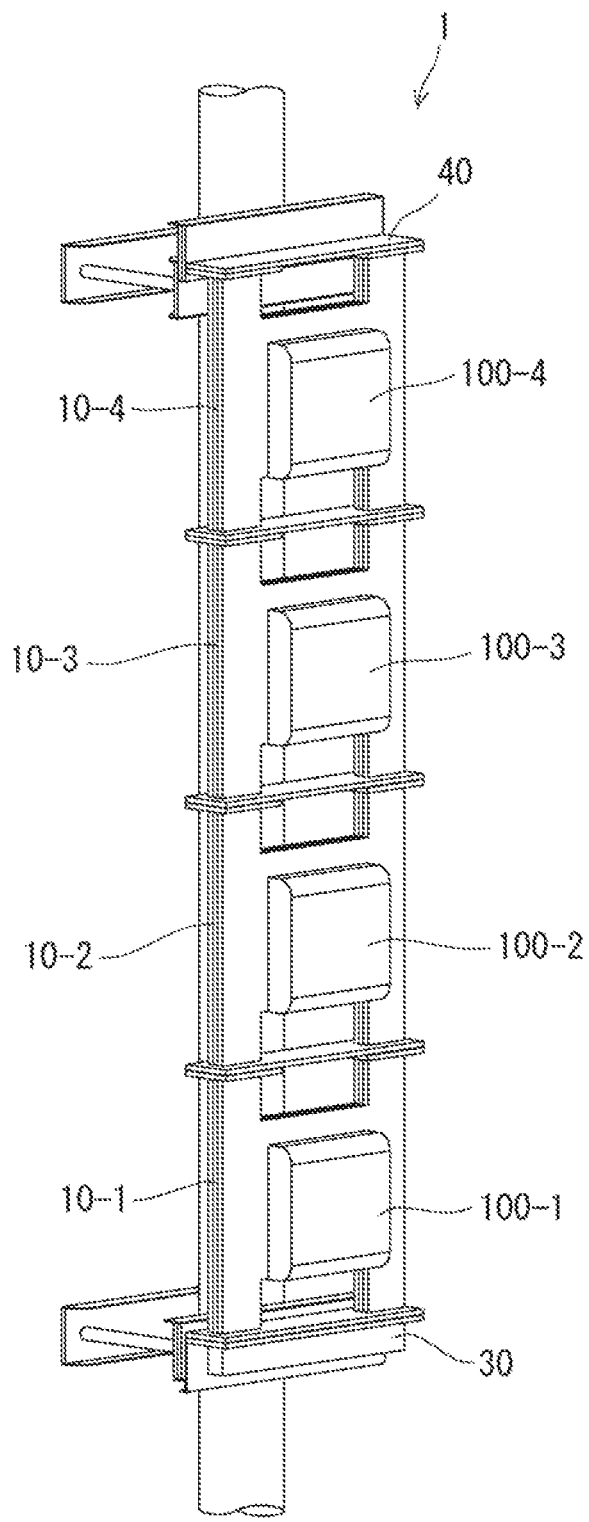
FIG. 3 is a diagram illustrating an external configuration example of a transmission/reception device including a waveguide device and a transmission/reception processing unit connected to the waveguide device according to a third example embodiment.
Figure 4:
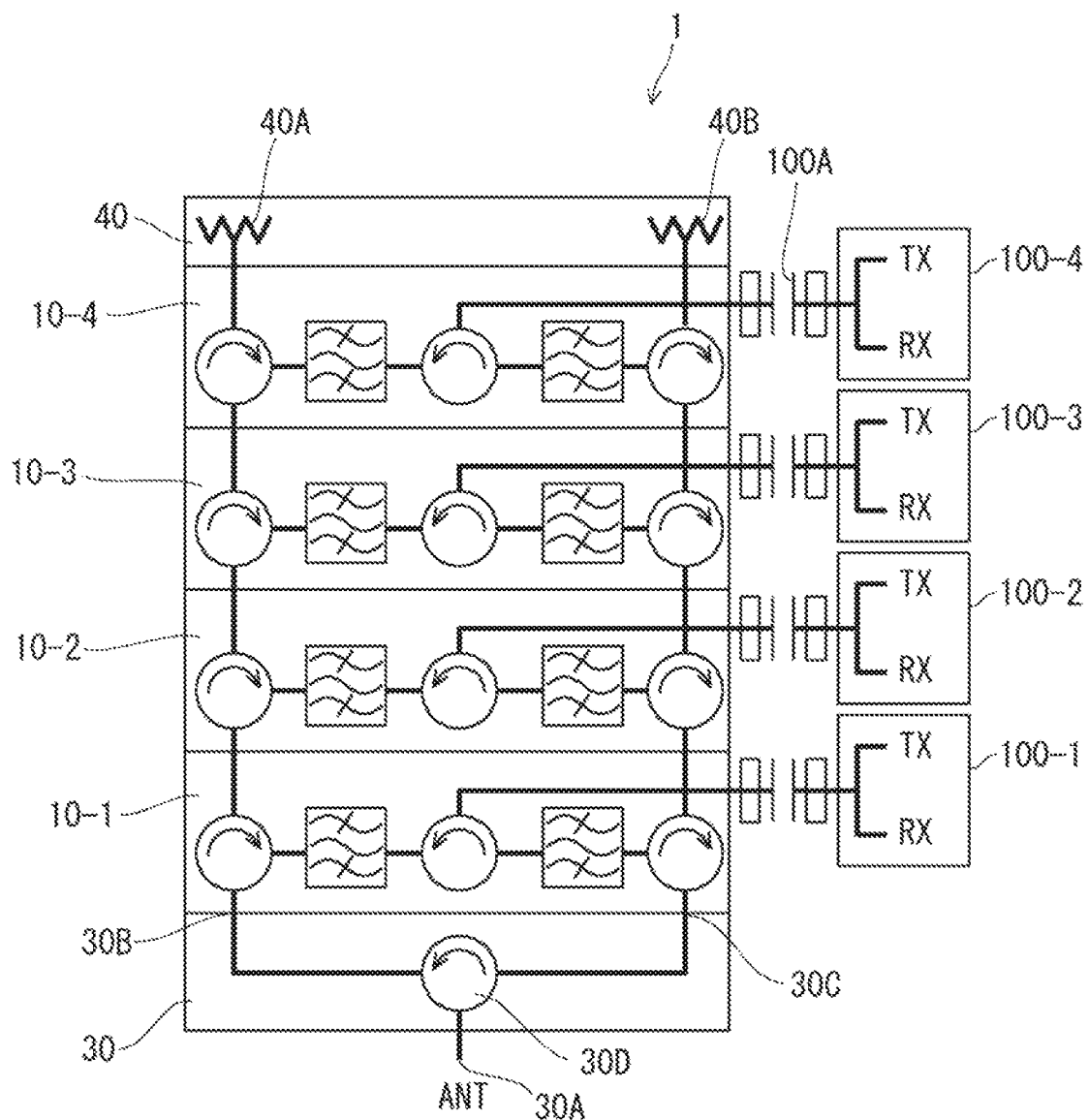
FIG. 4 is a diagram illustrating one example of an internal configuration of the transmission/reception device including the waveguide device and the transmission/reception processing unit connected to the waveguide device according to the third example embodiment.

FIG. 3 is a diagram illustrating an external configuration example of a transmission/reception device including a waveguide device and a transmission/reception processing unit connected to the waveguide device according to the third example embodiment. FIG. 4 is a diagram illustrating one example of an internal configuration of the transmission/reception device including the waveguide device and the transmission/reception processing unit connected to the waveguide device according to the third example embodiment. The transmission/reception device illustrated in FIGS. 3 and 4 is, for example, an outdoor installation-type transmission/reception device. FIG. 3 illustrates a state where the transmission/reception device is installed on a pole. In FIGS. 3 and 4, the transmission/reception device includes a waveguide device (antenna sharing device) 1 and four transmission/reception processing units 100-1, 100-2, 100-3, and 100-4. Hereinafter, the transmission/reception processing units 100-1, 100-2, 100-3, and 100-4 may be collectively referred to as a transmission/reception processing unit 100.

Then, the waveguide device 1 includes an antenna connection unit 30, four waveguide units 10-1, 10-2, 10-3, and 10-4, and a terminal unit 40. The transmission/reception processing unit 100-1 is connected to the waveguide unit 10-1, and the waveguide unit 10-1 and the transmission/reception processing unit 100-1 constitute one pair. Similarly, the transmission/reception processing unit 100-2 is connected to the waveguide unit 10-2, and the waveguide unit 10-2 and the transmission/reception processing unit 100-2 constitute one pair. Further, the transmission/reception processing unit 100-3 is connected to the waveguide unit 10-3, and the waveguide unit 10-3 and the transmission/reception processing unit 100-3 constitute one pair. Further, the transmission/reception processing unit 100-4 is connected to the waveguide unit 10-4, and the waveguide unit 10-4 and the transmission/reception processing unit 100-4 constitute one pair. In other words, in FIGS. 3 and 4, the outdoor installation-type transmission/reception device includes the four pairs connected in series in which each pair includes a waveguide unit 10 and the transmission/reception processing unit 100. Hereinafter, the waveguide units 10-1, 10-2, 10-3, and 10-4 may be collectively referred to as the waveguide unit 10. Note that, herein, the number of the waveguide units 10 included in the waveguide unit 1 is four, which is not limited thereto.

<Configuration Example of Antenna Connection Unit>

As illustrated in FIG. 4, the antenna connection unit 30 includes an antenna connection port 30A, a multiplex transmission wave input port 30B, a multiplex reception wave output port 30C, and a transmission/reception circulator 30D.

The antenna connection port 30A receives a multiplex reception radio wave received by a first antenna (not illustrated), and outputs the multiplex reception radio wave toward the transmission/reception circulator 30D. Further, the antenna connection port 30A outputs a multiplex transmission radio wave received from the transmission/reception circulator 30D toward the first antenna. Herein, the multiplex transmission radio wave is acquired by multiplexing a transmission radio wave fl$_{TX1}$, a transmission radio wave fl$_{TX2}$, a transmission radio wave fl$_{TX3}$, and a transmission radio wave fl$_{TX4}$ output from the transmission/reception processing units 100-1, 100-2, 100-3, and 100-4, respectively. Further, herein, the multiplex reception radio wave is acquired by multiplexing a reception radio wave fl$_{RX1}$, a reception radio wave fl$_{RX2}$, a reception radio wave fl$_{RX3}$, and a reception radio wave fl$_{RX4}$ input to the transmission/reception processing units 100-1, 100-2, 100-3, and 100-4, respectively.

The multiplex transmission wave input port 30B receives the multiplex transmission radio wave from the waveguide unit 10-1, and outputs the multiplex transmission radio wave toward the transmission/reception circulator 30D.

The transmission/reception circulator 30D outputs the multiplex reception radio wave received from the antenna connection port 30A toward the multiplex reception wave output port 30C. Further, the transmission/reception circulator 30D outputs the multiplex transmission radio wave received from the multiplex transmission wave input port 30B toward the antenna connection port 30A.

The multiplex reception wave output port 30C outputs the multiplex reception radio wave received from the transmission/reception circulator 30D toward the waveguide unit 10-1.

<Configuration Example of Transmission/reception Processing Unit>

As illustrated in FIG. 4, the transmission/reception processing unit 100 includes a transmission unit TX, a reception unit RX, and an interface unit 100A. The transmission/reception processing unit 100 according to the third example embodiment is configured to share the interface unit 100A between the transmission unit TX and the reception unit RX. Then, the interface unit 100A of the transmission/reception processing unit 100 is connected to an interface unit 11 of the waveguide unit 10 associated with the transmission/reception processing unit 100.

<Configuration Example of Waveguide Unit>

Figure 5:
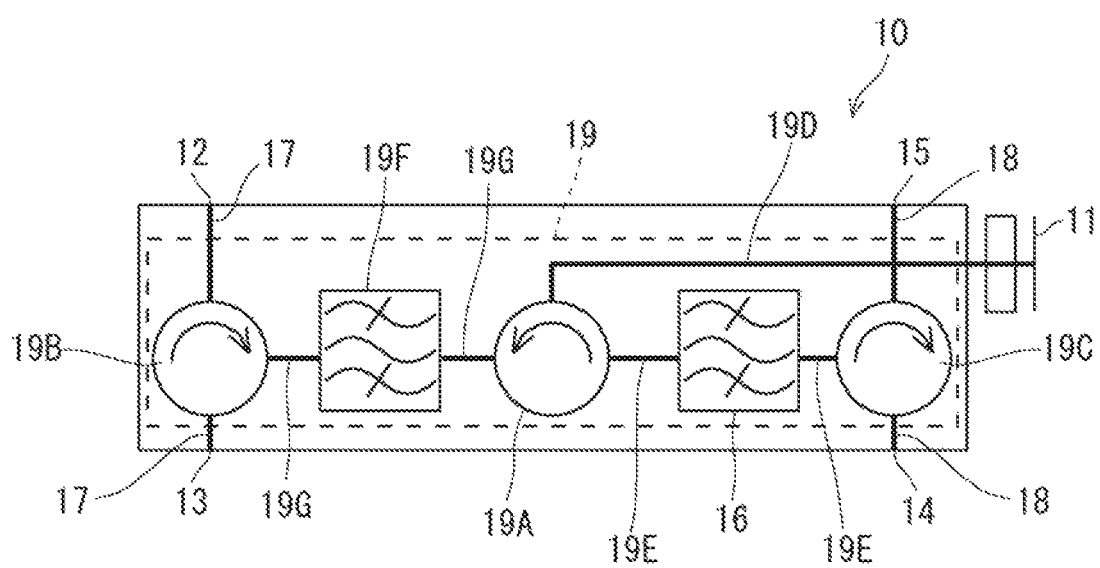
FIG. 5 is a diagram illustrating one example of a waveguide unit according to the third example embodiment.

FIG. 5 is a diagram illustrating one example of the waveguide unit according to the third example embodiment. In FIG. 5, the waveguide unit 10 according to the third example embodiment includes the interface unit 11, a transmission wave input port (first transmission wave input port) 12, a transmission wave output port (first transmission wave output port) 13, a reception wave input port (first reception wave input port) 14, a reception wave output port (first reception wave output port) 15, a waveguide (first waveguide, transmission wave waveguide) 17, a waveguide (second waveguide, reception wave waveguide) 18, and a connection unit 19. The waveguide units 10-1, 10-2, 10-3, and 10-4 illustrated in FIG. 4 have configurations identical to each other. Hereinafter, description is given by taking the waveguide unit 10-1 as an example.

The connection unit 19 includes a circulator (first circulator) 19A, a circulator (second circulator) 19B, a circulator (third circulator) 19C, a waveguide (third waveguide) 19D, a waveguide (fourth waveguide) 19E, a transmission band-pass filter 19F, a waveguide (fifth waveguide) 19G, and a reception band-pass filter 16.

The circulator 19A is connected to each of the waveguide 19D, the waveguide 19E, and the waveguide 19G. Then, the circulator 19A outputs a radio transmission wave received via the waveguide 19D to the waveguide 19G. Further, the circulator 19A outputs a reception radio wave received via the waveguide 19E to the waveguide 19D.

The circulator 19B is disposed in an intermediate portion of the waveguide 17. Further, the circulator 19C is disposed in an intermediate portion of the waveguide 18.

The waveguide 19D connects the circulator 19A to the interface unit 11.

The waveguide 19E connects the circulator 19A to the circulator 19C via the reception band-pass filter 16, and receives a multiplex reception radio wave from the circulator 19C. The multiplex reception radio wave input to the waveguide 19E includes a reception radio wave $fl_{RX1}$, a reception radio wave $fl_{RX2}$, a reception radio wave $fl_{RX3}$, and a reception radio wave $fl_{RX4}$. Then, the waveguide 19E outputs a multiplex reception radio wave reflected by the reception band-pass filter 16 to the circulator 19C. The reflected multiplex reception radio wave includes the reception radio wave $fl_{RX2}$, the reception radio wave $fl_{RX3}$, and the reception radio wave $fl_{RX4}$ except for the reception radio wave $fl_{RX1}$. In other words, the reception radio wave $fl_{RX1}$ to be received by the transmission/reception processing unit 100-1 is extracted in the reception band-pass filter 16 of the waveguide unit 10-1. On the other hand, the reception radio wave $fl_{RX2}$, the reception radio wave $fl_{RX3}$, and the reception radio wave $fl_{RX4}$ to be received by the transmission/reception processing units 100-2, 100-3, and 100-4 are guided to the waveguide units 10-2, 10-3, and 10-4 via the circulator 19C.

Further, the waveguide 19E outputs the reception radio wave $fl_{RX1}$ passed through the reception band-pass filter 16 to the circulator 19A.

The transmission band-pass filter 19F reflects a transmission radio wave except for a transmission radio wave $fl_{TX1}$, and also passes the transmission radio wave $fl_{TX1}$.

The waveguide 19G connects the circulator 19A to the circulator 19B via the transmission band-pass filter 19F, and receives a multiplex transmission radio wave from the circulator 19B. The multiplex transmission radio wave input to the waveguide 19G is acquired by multiplexing a transmission radio wave $fl_{TX2}$, a transmission radio wave $fl_{TX3}$, and a transmission radio wave $fl_{TX4}$. Then, the waveguide 19G outputs a multiplex transmission radio wave reflected by the transmission band-pass filter 19F to the circulator 19B. The reflected multiplex transmission radio wave is acquired by multiplexing the transmission radio wave $fl_{TX2}$, the transmission radio wave $fl_{TX3}$, and the transmission radio wave $fl_{TX4}$.

Further, the waveguide 19G outputs the transmission radio wave $fl_{TX1}$ passed through the transmission band-pass filter 19F to the circulator 19B. In other words, the transmission radio wave $fl_{TX1}$, the transmission radio wave $fl_{TX2}$, the transmission radio wave $fl_{TX3}$, and the transmission radio wave $fl_{TX4}$ are multiplexed in the waveguide 19G and the circulator 19B.

Herein, the reception band-pass filter 16 and the transmission band-pass filter 19F constitute an exchange unit being removable from the waveguide unit 10. In this way, when the transmission/reception processing unit 100 connected to the waveguide unit 10 is exchanged with the transmission/reception processing unit 100 having different transmission frequency and reception frequency, an exchange unit may only be exchanged with an exchange unit including the reception band-pass filter 16 and the transmission band-pass filter 19F associated with the transmission frequency and the reception frequency after the exchange.

<Configuration Example of Terminal Unit>

As illustrated in FIG. 4, the terminal unit 40 includes a termination resistor 40A for a transmission wave path and a termination resistor 40B for a reception wave path.

<Operation Example of Transmission/Reception Device>

An operation example of the transmission/reception device having the configuration described above will be described with reference to FIGS. 4 and 5.

<Operation During Transmission>

The transmission/reception processing unit 100-4 inputs the transmission radio wave $fl_{TX4}$ to the waveguide unit 10-4 via the interface unit 100A and the interface unit 11. The transmission radio wave $fl_{TX4}$ input to the waveguide unit 10-4 is output to the waveguide unit 10-3 via a waveguide 19D, a circulator 19A, a waveguide 19G, a transmission band-pass filter 19F, a circulator 19B, a waveguide 17, and a transmission wave output port 13 of the waveguide unit 10-4.

Further, the transmission/reception processing unit 100-3 inputs the transmission radio wave $fl_{TX3}$ to the waveguide unit 10-3 via the interface unit 100A and the interface unit 11. The transmission radio wave $fl_{TX3}$ input to the waveguide unit 10-3 is output to a circulator 19B via a waveguide 19D, a circulator 19A, a waveguide 19G, and a transmission band-pass filter 19F of the waveguide unit 10-3. On the other hand, the transmission radio wave $fl_{TX4}$ input to the waveguide unit 10-3 is input to the transmission band-pass filter 19F via a waveguide 17, the circulator 19B, and the waveguide 19G of the waveguide unit 10-3, is reflected by the transmission band-pass filter 19F, and is input to the circulator 19B.

Then, the transmission radio wave $fl_{TX3}$ and the transmission radio wave $fl_{TX4}$ input to the circulator 19B are multiplexed in the circulator 19B, and the multiplex transmission radio wave is output to the waveguide unit 10-2 via the waveguide 17 and a transmission wave output port 13 of the waveguide unit 10-3.

Similarly to the description above, the transmission radio wave $fl_{TX2}$ is further multiplexed in the waveguide unit 10-2, and the transmission radio wave $fl_{TX1}$ is further multiplexed in the waveguide unit 10-1. Then, the multiplex transmission radio wave including the transmission radio wave $fl_{TX1}$, the transmission radio wave $fl_{TX2}$, the transmission radio wave $fl_{TX3}$, and the transmission radio wave $fl_{TX4}$ is output from the transmission wave output port 13 of the waveguide unit 10-1 to the antenna connection unit 30.

The multiplex transmission radio wave input to the antenna connection unit 30 is output to the first antenna via the transmission/reception circulator 30D and the antenna connection port 30A. Then, the multiplex transmission radio wave is radiated from the first antenna toward a transmission/reception device on an opposed side (hereinafter may be referred to as an "opposed-side transmission/reception device").

<Operation During Reception>

A multiplex radio wave transmitted from the opposed-side transmission/reception device is received by the first antenna, and the multiplex reception radio wave is input to the antenna connection port 30A of the antenna connection unit 30. The multiplex reception radio signal includes the reception radio wave $f1_{RX1}$, the reception radio wave $f1_{RX2}$, the reception radio wave $f1_{RX3}$, and the reception radio wave $f1_{RX4}$.

The multiplex reception radio wave input to the antenna connection unit 30 is output to the waveguide unit 10-1 via the transmission/reception circulator 30D and the multiplex reception wave output port 30C.

The multiplex reception radio wave input to the waveguide unit 10-1 is output to the reception band-pass filter 16 via the waveguide 18, the circulator 19C, and the waveguide 19E of the waveguide unit 10-1.

The reception radio wave $f1_{RX1}$ of the multiplex reception radio wave input to the reception band-pass filter 16 is passed through the reception band-pass filter 16. Then, the passed reception radio wave $f1_{RX1}$ is input to the transmission/reception processing unit 100-1 via the waveguide 19E, the circulator 19A, the waveguide 19D, and the interface unit 11 of the waveguide unit 10-1. In this way, the reception radio wave $f1_{RX1}$ to be received by the transmission/reception processing unit 100-1 is extracted by the reception band-pass filter 16 in the waveguide unit 10-1. Further, the reception radio wave $f1_{RX2}$, the reception radio wave $f1_{RX3}$, and the reception radio wave $f1_{RX4}$ of the multiplex reception radio wave input to the reception band-pass filter 16 except for the reception radio wave $f1_{RX1}$ are reflected by the reception band-pass filter 16. Then, the multiplex reception radio wave including the reflected reception radio wave $f1_{RX2}$, reception radio wave $f1_{RX3}$, and reception radio wave $f1_{RX4}$ is output to the waveguide unit 10-2 via the waveguide 19E, the circulator 19C, the waveguide 18, and the reception wave output port 15 of the waveguide unit 10-1.

Similarly, the reception radio wave $f1_{RX2}$ to be received by the transmission/reception processing unit 100-2 is extracted in the waveguide unit 10-2. Further, the reception radio wave $f1_{RX3}$ to be received by the transmission/reception processing unit 100-3 is extracted in the waveguide unit 10-3. Further, the reception radio wave $f1_{RX4}$ to be received by the transmission/reception processing unit 100-4 is extracted in the waveguide unit 10-4.

As described above, the connection unit 19 in the waveguide unit 10-1 according to the third example embodiment includes the circulator 19A, the circulator 19B disposed in the intermediate portion of the waveguide 17, the circulator 19C disposed in the intermediate portion of the waveguide 18, and the waveguide 19D that connects the circulator 19A to the interface unit 11. Further, the connection unit 19 includes the waveguide 19E, the transmission band-pass filter 19F, and the waveguide 19G. The waveguide 19E connects the circulator 19A to the circulator 19C via the reception band-pass filter 16, receives the multiplex reception radio wave from the circulator 19C, outputs the reception radio wave reflected by the reception band-pass filter 16 to the circulator 19C, and also outputs the reception radio wave passed through the reception band-pass filter 16 to the circulator 19A. The transmission band-pass filter 19F reflects a transmission radio wave except for a transmission radio wave to be passed, and also passes the transmission radio wave to be passed. The waveguide 19G connects the circulator 19A to the circulator 19B via the transmission band-pass filter 19F, receives the transmission radio wave from the circulator 19B, outputs the transmission radio wave reflected by the transmission band-pass filter 19F to the circulator 19B, and also outputs the transmission radio wave passed through the transmission band-pass filter 19F to the circulator 19B.

With the configuration of the waveguide unit 10, the number of circulators disposed in each of the waveguide (transmission wave path) 17 and the waveguide (reception wave path) 18 can be reduced further than that in a configuration in which the transmission wave path and the reception wave path are a common path. Thus, a loss and a delay in each of the transmission wave path and the reception wave path can be reduced.

Further, in the waveguide unit 10 according to the third example embodiment, the reception band-pass filter 16 and the transmission band-pass filter 19F constitute an exchange unit being removable from the waveguide unit 10.

The configuration of the waveguide unit 10 makes it easy to change a transmission frequency and a reception frequency in the transmission/reception device.

Fourth Example Embodiment

A fourth example embodiment relates to a method of connecting a plurality of waveguide units and a method of adding a waveguide unit.

<Method of Connecting a Plurality of Waveguide Units>

Figure 6:
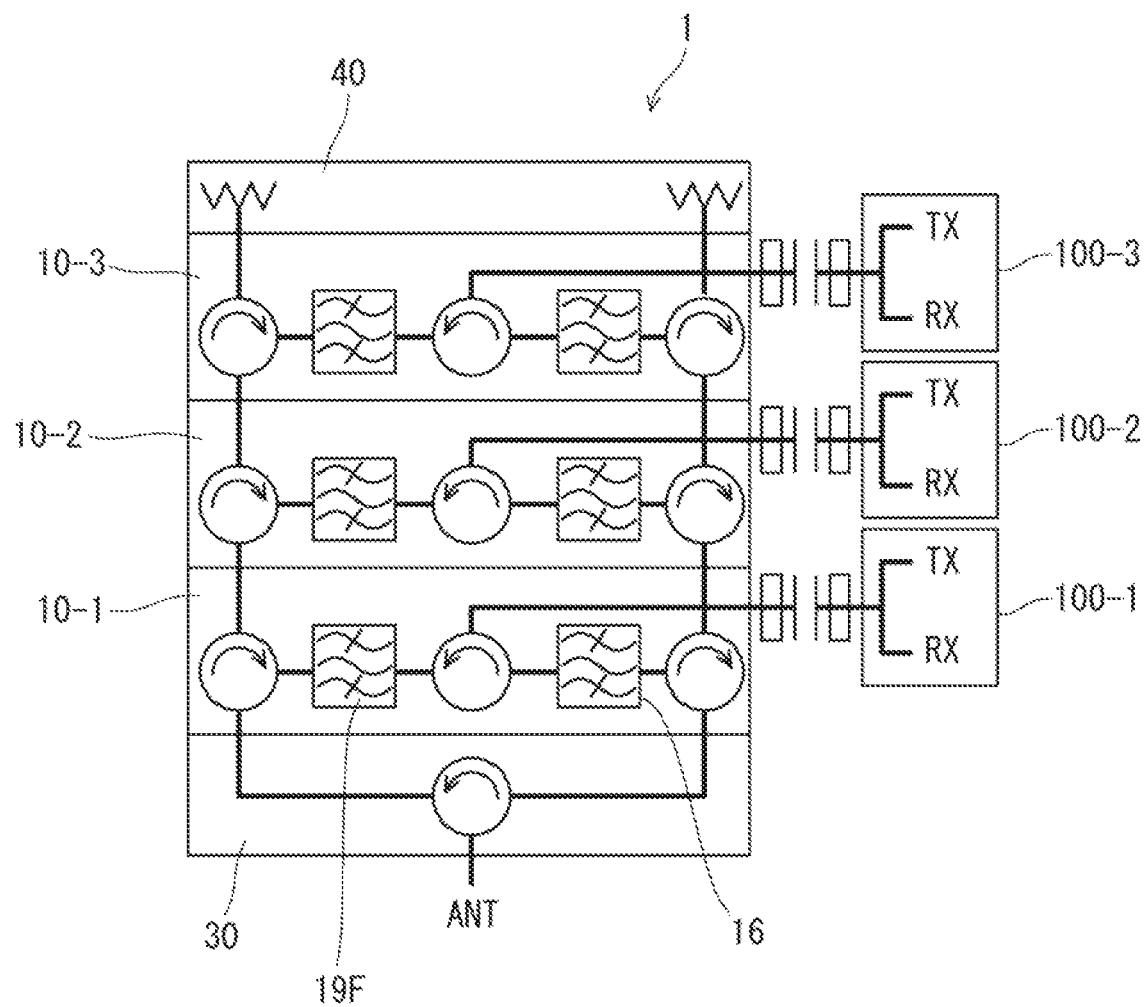
FIG. 6 is a diagram illustrating one example of a first transmission/reception device according to a fourth example embodiment.
Figure 7:
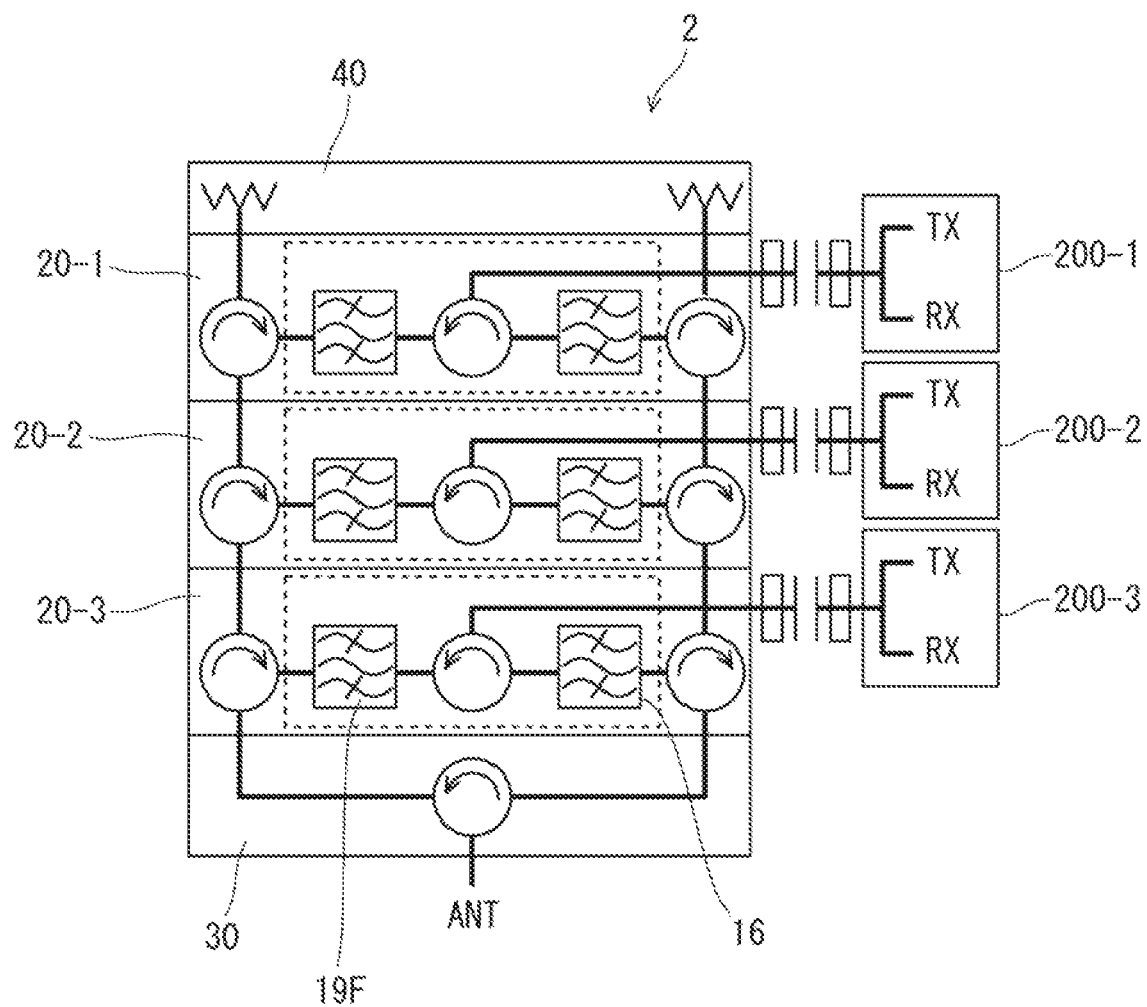
FIG. 7 is a diagram illustrating one example of a second transmission/reception device being opposed to the first transmission/reception device according to the fourth example embodiment.

FIG. 6 is a diagram illustrating one example of a first transmission/reception device according to the fourth example embodiment. FIG. 7 is a diagram illustrating one example of a second transmission/reception device being opposed to the first transmission/reception device according to the fourth example embodiment.

As illustrated in FIG. 6, the first transmission/reception device according to the fourth example embodiment has a configuration in which three waveguide units 10 are connected as compared with the transmission/reception device according to the third example embodiment in order to facilitate description of the connection method. On the other hand, as illustrated in FIG. 7, the second transmission/reception device (namely, an opposed-side transmission/reception device) being opposed to the first transmission/reception device has a configuration in which three waveguide units 20 are connected.

Specifically, as illustrated in FIG. 6, in a waveguide device 1 of the first transmission/reception device according to the fourth example embodiment, waveguide units 10-1, 10-2, and 10-3 are connected in series in order of the waveguide units 10-1, 10-2, and 10-3 in order from a first antenna (not illustrated) side connected to the first transmission/reception device, namely, in order from an antenna connection unit 30 side. Then, transmission/reception processing units 100-1, 100-2, and 100-3 are connected to the waveguide units 10-1, 10-2, and 10-3, respectively. As described above, a transmission frequency and a reception frequency of the transmission/reception processing unit 100-1 are $f1_{TX1}$ and $f1_{RX1}$, respectively. Further, a transmission frequency and a reception frequency of the transmission/reception processing unit 100-2 are $f1_{TX2}$ and $f1_{RX2}$, respectively. A transmission frequency and a reception frequency of the transmission/reception processing unit 100-3 are $f1_{TX3}$ and $f1_{RX3}$, respectively.

On the other hand, as illustrated in FIG. 7, in a waveguide device 2 of the second transmission/reception device being the opposed-side transmission/reception device, waveguide units 20-1, 20-2, and 20-3 are connected in series in order of the waveguide units 20-3, 20-2, and 20-1 in order from a second antenna (not illustrated) side connected to the second transmission/reception device, namely, in order from an antenna connection unit 30 side. Each of the waveguide units 20-1, 20-2, and 20-3 has a configuration similar to that of the waveguide unit 10. Then, transmission/reception processing units 200-1, 200-2, and 200-3 are connected to the waveguide units 20-1, 20-2, and 20-3, respectively. A transmission frequency and a reception frequency of the transmission/reception processing unit 200-1 are $f2_{TX1}$ and $f2_{RX1}$, respectively. A transmission frequency and a reception frequency of the transmission/reception processing unit 200-2 are $f2_{TX2}$ and $f2_{RX2}$, respectively. A transmission frequency and a reception frequency of the transmission/reception processing unit 200-3 are $f2_{TX3}$ and $f2_{RX3}$, respectively. Thus, a transmission band-pass filter 19F and a reception band-pass filter 16 of the waveguide unit 20-1 pass the transmission radio wave $f2_{TX1}$ and the reception radio wave $f2_{RX1}$, respectively. Similarly, a transmission band-pass filter 19F and a reception band-pass filter 16 of the waveguide unit 20-2 pass the transmission radio wave $f2_{TX2}$ and the reception radio wave $f2_{RX2}$, respectively. A transmission band-pass filter 19F and a reception band-pass filter 16 of the waveguide unit 20-3 pass the transmission radio wave $f2_{TX3}$ and the reception radio wave $f2_{RX3}$, respectively.

Then, the transmission/reception processing units 200-1, 200-2, and 200-3 are associated with the transmission/reception processing units 100-1, 100-2, 100-3, respectively. In other words, the transmission/reception processing unit 200-1 and the transmission/reception processing unit 100-1 are communication partners, the transmission/reception processing unit 200-2 and the transmission/reception processing unit 100-2 are communication partners, and the transmission/reception processing unit 200-3 and the transmission/reception processing unit 100-3 are communication partners. In other words, the transmission frequency $f1_{TX1}$ of the transmission/reception processing unit 100-1 is the same as the reception frequency $f2_{RX1}$ of the transmission/reception processing unit 200-1, and the reception frequency $f1_{RX1}$ of the transmission/reception processing unit 100-1 is the same as the transmission frequency $f2_{TX1}$ of the transmission/reception processing unit 200-1. Similarly, the transmission frequency $f1_{TX2}$ is the same as the reception frequency $f2_{RX2}$. The reception frequency $f1_{RX2}$ is the same as the transmission frequency $f2_{TX2}$. The transmission frequency $f1_{TX3}$ is the same as the reception frequency $f2_{RX3}$. The reception frequency $f1_{RX3}$ is the same as the transmission frequency $f2_{TX3}$.

Herein, a high/low relationship between a plurality of transmission frequencies and a high/low relationship between a plurality of reception frequencies preferably satisfy a relationship of $f1_{TX1}<f1_{TX2}<f1_{TX3}$ and $f1_{RX1}<f1_{RX2}<f1_{RX3}$, or preferably satisfy a relationship of $f1_{TX1}>f1_{TX2}>f1_{TX3}$ and $f1_{RX1}>f1_{RX2}>f1_{RX3}$, which is not particularly limited thereto. In this way, by coupling the waveguide unit 10 in order from a low frequency to a high frequency or coupling the waveguide unit 10 in order from a high frequency to a low frequency, it is easy to assume a loss, a phase deviation, and a frequency deviation, and it is easy to correct a difference occurring between channels.

As described above, according to the connection method in the fourth example embodiment, in the waveguide device 1 of the first transmission/reception device, the waveguide units 10-1, 10-2, and 10-3 are connected in series in order of the waveguide units 10-1, 10-2, and 10-3 in order from the first antenna (not illustrated) side connected to the first transmission/reception device. On the other hand, in the waveguide device 2 of the second transmission/reception device being the opposed-side transmission/reception device, the waveguide units 20-1, 20-2, and 20-3 are connected in series in order of the waveguide units 20-3, 20-2, and 20-1 in order from the second antenna (not illustrated) side connected to the second transmission/reception device. In other words, the waveguide device 1 and the waveguide device 2 being the opposed-side waveguide device of the waveguide device 1 have reverse connection orders of the waveguide units when viewed from the antenna side.

The connection method can reduce errors in a loss and a delay between the waveguide unit 10-1 and the waveguide unit 20-1, a loss and a delay between the waveguide unit 10-2 and the waveguide unit 20-2, and a loss and a delay between the waveguide unit 10-3 and the waveguide unit 20-3. In other words, loss equalization and delay equalization can be achieved.

<Method of Adding Waveguide Unit>

Figure 8:
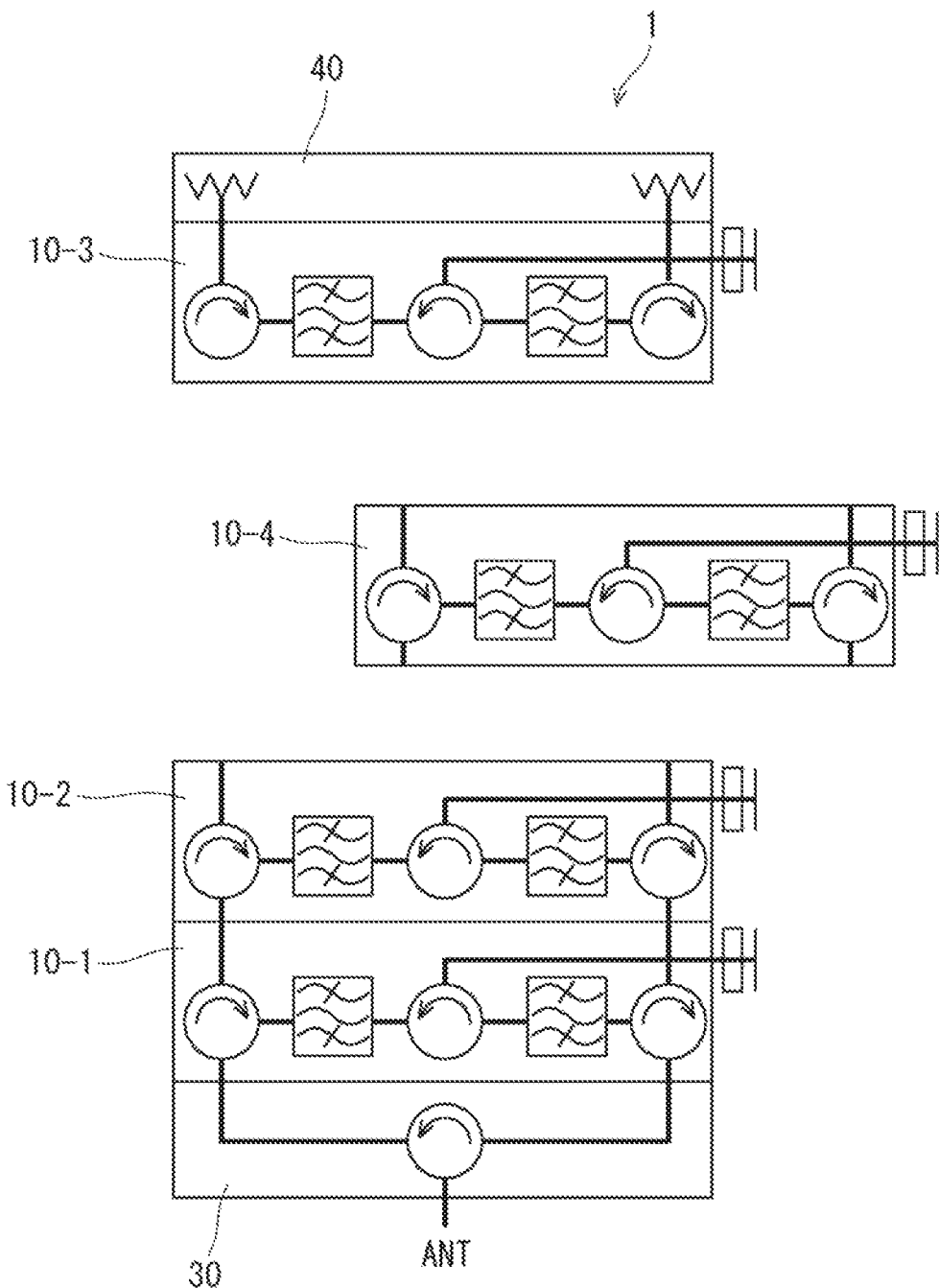
FIG. 8 is a diagram illustrating an example of addition of a waveguide unit in the first transmission/reception device according to the fourth example embodiment.
Figure 9:
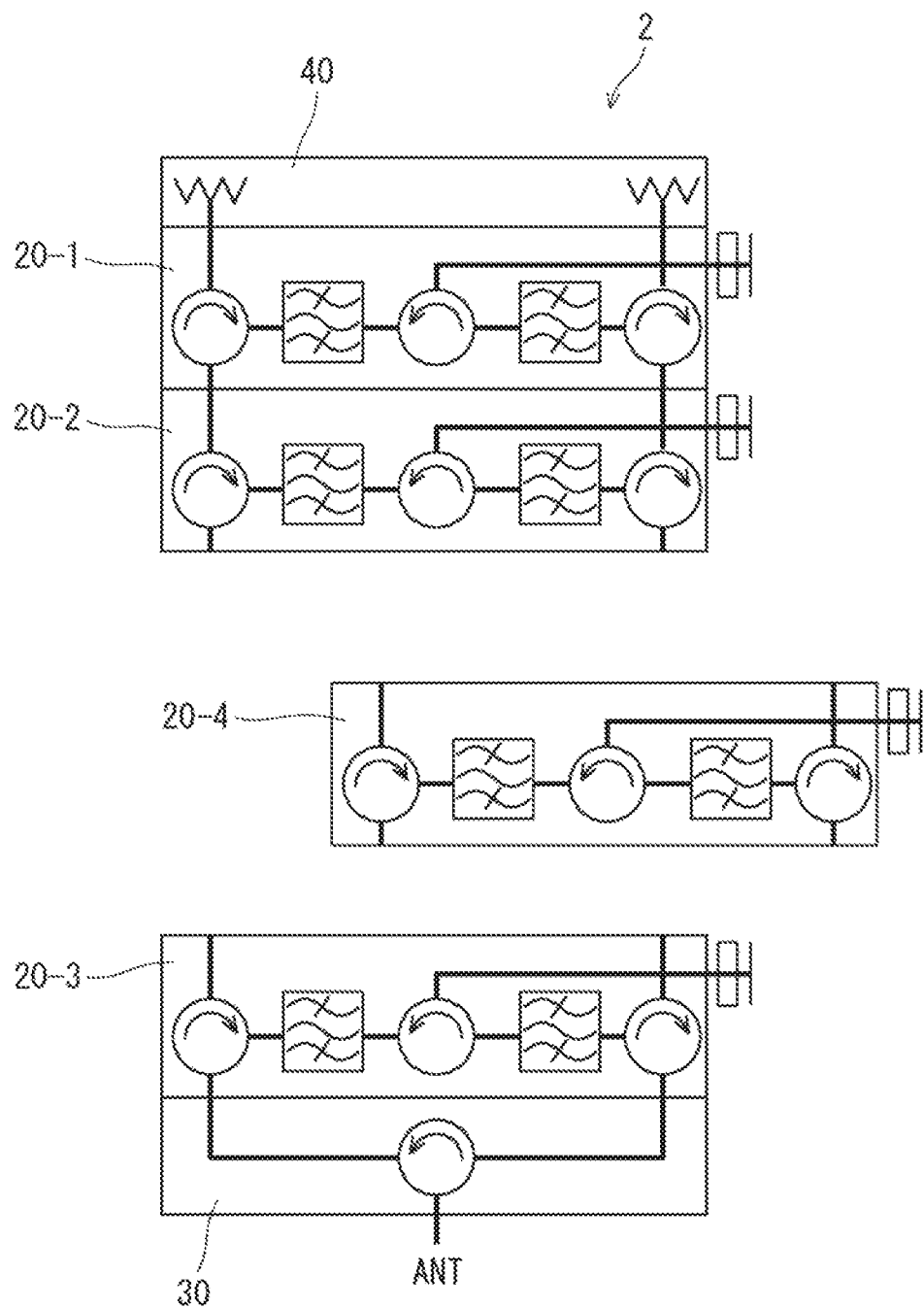
FIG. 9 is a diagram illustrating an example of addition of a waveguide unit in the second transmission/reception device being an opposed-side transmission/reception device of the first transmission/reception device according to the fourth example embodiment.

FIG. 8 is a diagram illustrating an example of addition of a waveguide unit in the first transmission/reception device according to the fourth example embodiment. FIG. 9 is a diagram illustrating an example of addition of a waveguide unit in the second transmission/reception device being the opposed-side transmission/reception device of the first transmission/reception device according to the fourth example embodiment.

As illustrated in FIGS. 8 and 9, even when a waveguide unit is added, the waveguide device 1 and the waveguide device 2 being the opposed-side waveguide device of the waveguide device 1 add a waveguide unit in reverse connection orders of a plurality of waveguide units when viewed from the antenna side. Furthermore, in any of the waveguide device 1 and the waveguide device 2, a waveguide unit is preferably added in such a way as to be inserted between two waveguide units connected in series.

For example, in FIG. 8, a waveguide unit 10-4 is inserted between the waveguide unit 10-2 and the waveguide unit 10-3 connected in series. In FIG. 9, a waveguide unit 20-4 is inserted between the waveguide unit 20-3 and the waveguide unit 20-2 connected in series.

As described above, according to the method of adding a waveguide unit in the fourth example embodiment, the waveguide device 1 and the waveguide device 2 being the opposed-side waveguide device of the waveguide device 1 add a waveguide unit in reverse connection orders of a plurality of waveguide units when viewed from the antenna side.

The addition method can achieve loss equalization and delay equalization, similarly to the connection method described above.

Further, the method of adding a waveguide unit according to the fourth example embodiment adds a waveguide unit in such a way as to insert the waveguide unit between two waveguide units connected in series in any of the waveguide device 1 and the waveguide device 2.

The addition method can reduce a risk that passive intermodulation (PIM) deteriorates, and can also reduce a possibility of occurrence of a failure to set a correction value for correcting a difference occurring between channels during addition. Herein, a waveguide unit connected to the antenna connection unit 30 is a waveguide unit that requires caution about the PIM the most. Therefore, when a waveguide unit to be added is inserted between the antenna connection unit 30 and a waveguide unit that are already connected, a risk that the PIM deteriorates increases due to a change in connection state. Further, a loss, a phase deviation, and the like of the entire transmission and reception between the waveguide device 1 and the waveguide device 2 having the reverse connection orders of the plurality of waveguide units to each other tend to be inclined at both end sides and tend to be flat at a place other than the both end sides. In a system including the waveguide device 1 and the waveguide device 2, a correction value for correcting a difference occurring between channels is set in consideration of the tendency. Thus, a correction value for a loss and a phase at both ends is often different from a correction value for a place other than the both ends, and a correction value being set may need to be changed when a frequency at the both ends changes. This more easily causes a failure to change setting and an error in a set value. As described above, a correction value for both end sides at the inclination tends to occur does not need to be changed for addition at a place other than the both ends, and a possibility of occurrence of a failure to change setting and the like during the addition can be reduced. Furthermore, since a connection to the antenna connection unit 30 is not disconnected, the risk that the PIM deteriorates is also reduced.

Fifth Example Embodiment

Figure 10:
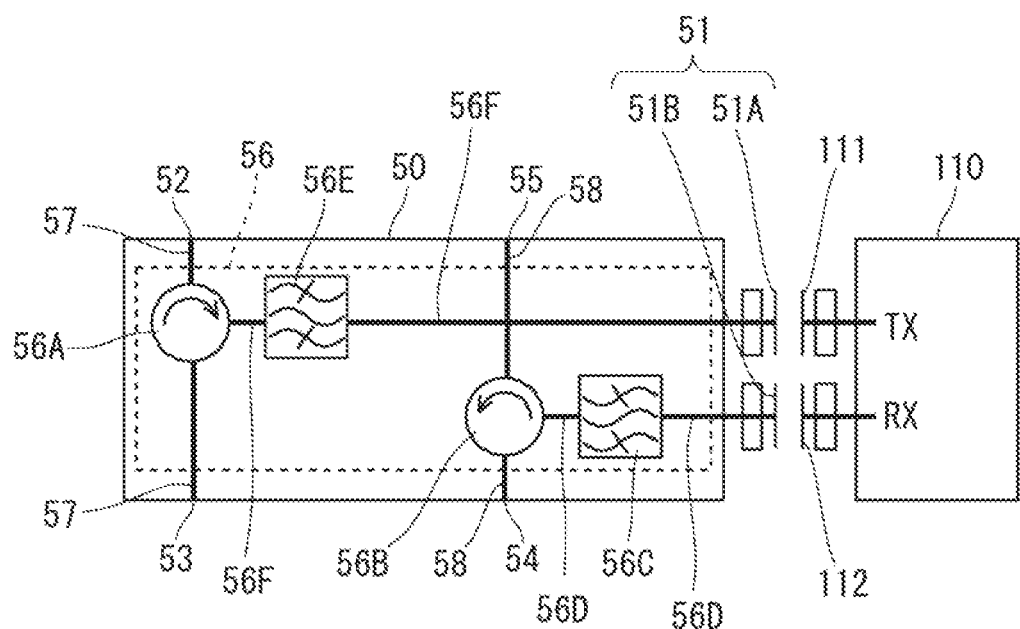
FIG. 10 is a diagram illustrating one example of a waveguide unit and a transmission/reception processing unit connected to the waveguide unit according to a fifth example embodiment.

A fifth example embodiment relates to a variation of a configuration of a transmission/reception processing unit and a waveguide unit. FIG. 10 is a diagram illustrating one example of a waveguide unit and a transmission/reception processing unit connected to the waveguide unit according to the fifth example embodiment.

<Configuration Example of Transmission/reception Processing Unit>

In FIG. 10, a transmission/reception processing unit 110 includes a transmission processing unit TX, a reception processing unit RX, a transmission interface unit 111, and a reception interface unit 112.

The transmission processing unit TX is connected to the transmission interface unit 111. Further, the reception processing unit RX is connected to the reception interface unit 112. In other words, the transmission/reception processing unit 110 according to the fifth example embodiment has a configuration in which the transmission processing unit TX and the reception processing unit RX are independent (that is, separated) in contrast to the transmission/reception processing unit 100 according to the third example embodiment.

<Configuration Example of Waveguide Unit>

In FIG. 10, a waveguide unit 50 includes an interface unit 51, a transmission wave input port (first transmission wave input port) 52, a transmission wave output port (first transmission wave output port) 53, a reception wave input port (first reception wave input port) 54, a reception wave output port (first reception wave output port) 55, a connection unit 56, a waveguide (first waveguide, transmission wave waveguide) 57, and a waveguide (second waveguide, reception wave waveguide) 58.

The interface unit 51 includes a transmission interface unit 51A and a reception interface unit 51B. The transmission interface unit 51A is connected to the transmission interface unit 111 of the transmission/reception processing unit 110. Further, the reception interface unit 51B is connected to the reception interface unit 112 of the transmission/reception processing unit 110.

The transmission wave input port 52, the transmission wave output port 53, the reception wave input port 54, the reception wave output port 55, the waveguide 57, and the waveguide 58 have the same functions as those of the transmission wave input port 12, the transmission wave output port 13, the reception wave input port 14, the reception wave output port 15, the waveguide 17, and the waveguide 18 that are described in the first example embodiment and the second example embodiment.

The connection unit 56 includes a circulator (fifth circulator) 56A, a circulator (sixth circulator) 56B, a reception band-pass filter 56C, a waveguide (eighth waveguide) 56D, a transmission band-pass filter 56E, and a waveguide (ninth waveguide) 56F. The reception band-pass filter 56C and the transmission band-pass filter 56E have the same functions as those of the reception band-pass filter 16 and the transmission band-pass filter 19F that are described in the third example embodiment.

The waveguide 56D connects the circulator 56B to the reception interface unit 112 via the reception band-pass filter 56C, and receives a multiplex reception radio wave from the circulator 56B. Further, the waveguide 56D outputs a reflected wave reflected by the reception band-pass filter 56C to the circulator 56B. Further, the waveguide 56D outputs a reception radio wave $f1_{RX1}$ passed through the reception band-pass filter 56C to the reception interface unit 112.

The waveguide 56F connects the circulator 56A to the transmission interface unit 111 via the transmission band-pass filter 56E, receives a transmission radio wave $f1_{TX2}$ from the circulator 56A, and outputs the transmission radio wave $f1_{TX2}$ reflected by the transmission band-pass filter to the circulator 56A. Further, the waveguide 56F outputs a transmission radio wave $f1_{TX1}$ passed through the transmission band-pass filter 56E to the circulator 56A.

As described above, according to the fifth example embodiment, the transmission interface unit 51A and the reception interface unit 51B are separated in the waveguide unit 50. With the configuration of the waveguide unit 50, the circulator 19A and the like become unnecessary as compared with the waveguide unit 10 according to the third example embodiment, and a waveguide unit having a simple configuration can be achieved.

Sixth Example Embodiment

Figure 11:
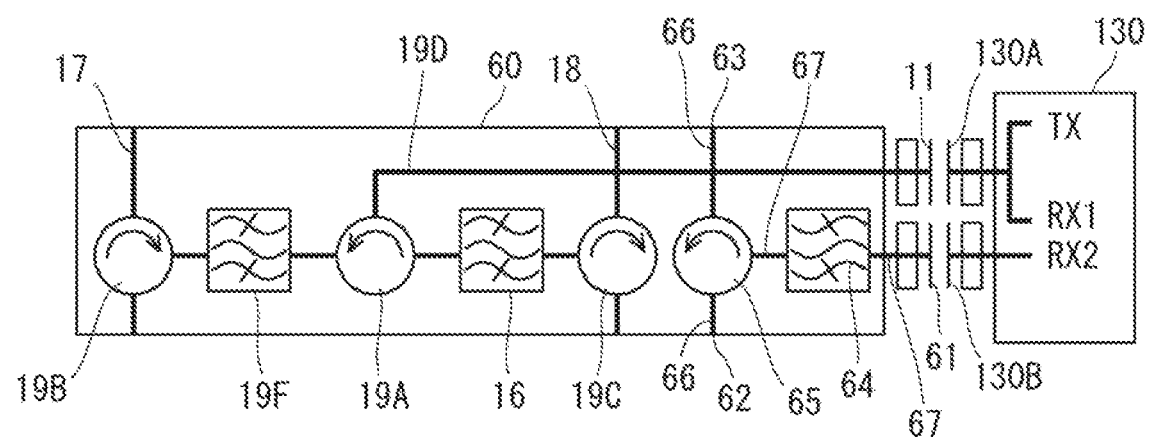
FIG. 11 is a diagram illustrating one example of a waveguide unit and a transmission/reception processing unit connected to the waveguide unit according to a sixth example embodiment.
Figure 12:
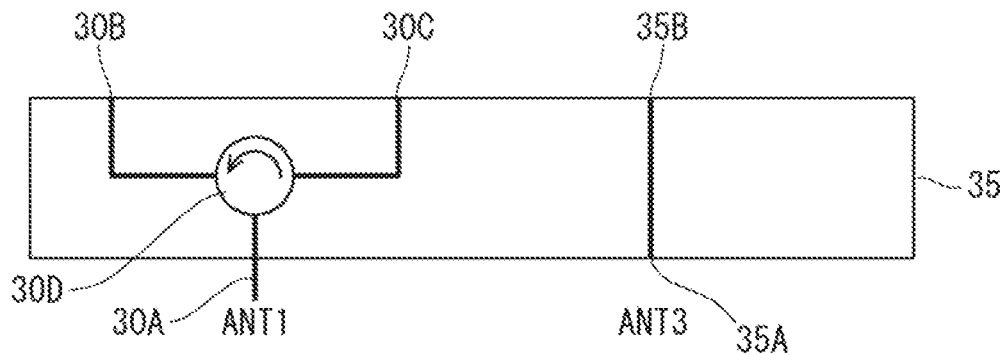
FIG. 12 is a diagram illustrating one example of an antenna connection unit according to the sixth example embodiment.

A sixth example embodiment relates to a variation of a configuration of a transmission/reception processing unit, a waveguide unit, and an antenna connection unit. FIG. 11 is a diagram illustrating one example of a waveguide unit and a transmission/reception processing unit connected to the waveguide unit according to the sixth example embodiment. FIG. 12 is a diagram illustrating one example of an antenna connection unit according to the sixth example embodiment.

<Configuration Example of Antenna Connection Unit>

In FIG. 12, an antenna connection unit 35 further includes an antenna connection port 35A and a multiplex reception wave output port 35B as compared with the antenna connection unit 30 described in the third example embodiment. The antenna connection port 35A receives a multiplex reception radio signal received by a third antenna (not illustrated), and outputs the multiplex reception radio signal toward the multiplex reception wave output port 35B. The multiplex reception wave output port 35B outputs the multiplex reception radio wave input to the antenna connection port 35A to a waveguide unit 60 described later.

<Configuration Example of Transmission/Reception Processing Unit>

In FIG. 11, a transmission/reception processing unit 130 includes partial units TX and RX1, a partial unit RX2, an interface unit 130A, and an interface unit 130B. The partial units TX and RX1 and the interface unit 130A have the same functions as those of the transmission/reception processing unit 100 and the interface unit 100A that are described in the third example embodiment.

The partial unit RX2 is connected to the interface unit 130B, and receives a reception radio wave $f3_{RX}$ to be received from the waveguide unit 60 via the interface unit 130B. In other words, the transmission/reception processing unit 130 includes two reception systems in order to improve communication quality by reducing an influence of such as fading, and the like. Note that the reception radio wave $f3_{RX}$ may be the same as or different from the reception radio wave $f1_{RX}$ described above.

<Configuration Example of Waveguide Unit>

In FIG. 11, the waveguide unit 60 further includes an interface unit (second interface unit) 61, a reception wave input port (second reception wave input port) 62, a reception wave output port (second reception wave output port) 63, a reception band-pass filter (second reception band-pass filter) 64, a circulator (fourth circulator) 65, a waveguide (sixth waveguide) 66, and a waveguide (seventh waveguide) 67 as compared with the waveguide unit 10 described in the third example embodiment.

The interface unit 61 is connected to the interface unit 130B of the transmission/reception processing unit 130.

The reception wave input port 62 receives the multiplex reception radio wave received by the third antenna (not illustrated) from the antenna connection unit 35. In other words, the multiplex reception radio wave output from the multiplex reception wave output port 35B is input to the reception wave input port 62.

The reception wave output port 63 outputs a reception radio wave $f3_{RX2}$ to be received by another waveguide unit 60 in an output stage to the another waveguide unit 60.

The waveguide 66 connects the reception wave input port 62 to the reception wave output port 63 via the circulator 65.

The reception band-pass filter 64 reflects the multiplex reception radio wave input to the reception wave input port 62 except for a reception radio wave $f3_{RX1}$ to be received by the waveguide unit 60, and, on the other hand, passes the reception radio wave $f3_{RX1}$.

The circulator 65 is disposed in an intermediate portion of the waveguide 66. Then, the circulator 65 receives the multiplex reception radio wave input from the reception wave input port 62 via the waveguide 66, and outputs the received multiplex reception radio wave to the waveguide 67. Further, the circulator 65 receives a reflected wave reflected by the reception band-pass filter 64 via the waveguide 67, and outputs the received reflected wave to the waveguide 66 toward the reception wave output port 63.

The waveguide 67 connects the interface unit 61 to the circulator 65 via the reception band-pass filter 64, receives the multiplex reception radio wave from the circulator 65, and outputs the reception radio wave $f3_{RX1}$ passed through the reception band-pass filter 64 to the interface unit 61. Further, the waveguide 67 outputs the reflected wave reflected by the reception band-pass filter 64 to the circulator 65.

As described above, the sixth example embodiment can achieve a transmission/reception processing unit, a waveguide unit, and an antenna connection unit, being capable of executing a reception diversity.

Seventh Example Embodiment

Figure 13:
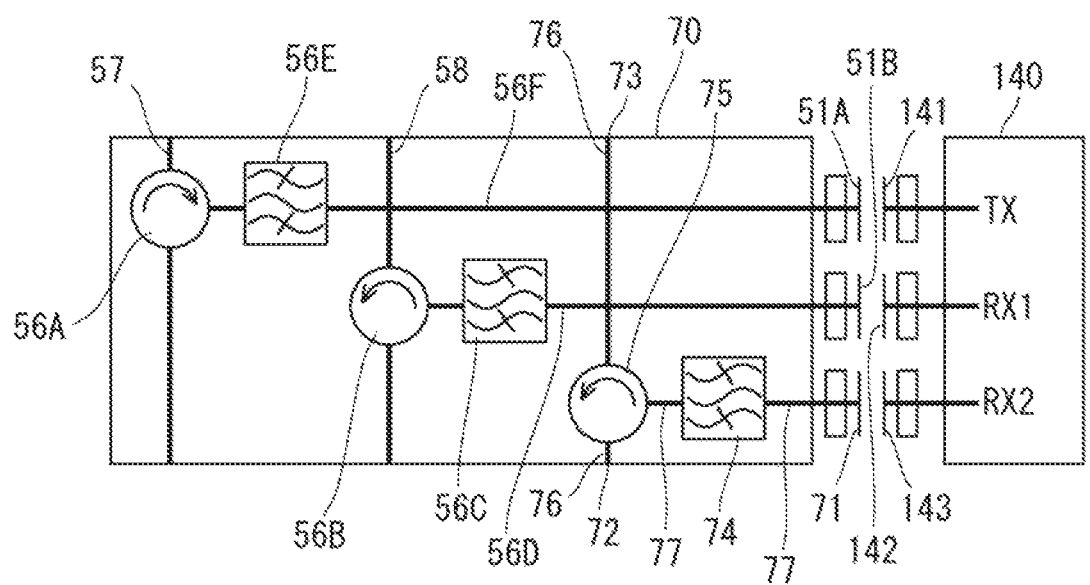
FIG. 13 is a diagram illustrating one example of a waveguide unit and a transmission/reception processing unit connected to the waveguide unit according to a seventh example embodiment.

A seventh example embodiment relates to a variation of a configuration of a transmission/reception processing unit and a waveguide unit. The seventh example embodiment has a configuration capable of executing a reception diversity similarly to the sixth example embodiment. However, the configuration of the transmission/reception processing unit and the waveguide unit according to the seventh example embodiment is based on the configuration of the transmission/reception processing unit and the waveguide unit described in the fifth example embodiment. FIG. 13 is a diagram illustrating one example of the waveguide unit and the transmission/reception processing unit connected to the waveguide unit according to the seventh example embodiment.

<Configuration Example of Transmission/Reception Processing Unit>

In FIG. 13, a transmission/reception processing unit 140 includes a transmission processing unit TX, a reception processing unit RX1, a reception processing unit RX2, and interface units 141, 142, and 143.

The transmission processing unit TX is connected to the interface unit 141. Further, the reception processing unit RX1 is connected to the interface unit 142. Further, the reception processing unit RX2 is connected to the interface unit 143. In other words, the transmission/reception processing unit 110 according to the seventh example embodiment has a configuration in which the transmission processing unit TX, the reception processing unit RX1, and the reception processing unit RX2 are independent (that is, separated).

<Configuration Example of Waveguide Unit>

In FIG. 13, a waveguide unit 70 further includes an interface unit (third interface unit) 71, a reception wave input port (second reception wave input port) 72, a reception wave output port (second reception wave output port) 73, a reception band-pass filter (second reception band-pass filter) 74, a circulator (fourth circulator) 75, a waveguide (sixth waveguide) 76, and a waveguide (seventh waveguide) 77 as compared with the waveguide unit 50 according to the fifth example embodiment.

The interface unit 71, the reception wave input port 72, the reception wave output port 73, the reception band-pass filter 74, the circulator 75, the waveguide 76, and the waveguide 77 have the same functions as those of the interface unit 61, the reception wave input port 62, the reception wave output port 63, the reception band-pass filter 64, the circulator 65, the waveguide 66, and the waveguide 67 that are described in the sixth example embodiment.

As described above, the transmission/reception processing unit 140 and the waveguide unit 70 according to the seventh example embodiment can also achieve a transmission/reception processing unit, a waveguide unit, and an antenna connection unit, being capable of executing a reception diversity.

Eighth Example Embodiment

An eighth example embodiment relates to a transmission/reception device configured to be bent into a U-shape near a central portion by using an inter-unit connection unit as compared with the transmission/reception device configured to extend linearly in the third example embodiment. In this way, a compact layout of the transmission/reception device can be achieved.

<Configuration Example of Transmission/Reception Device and Waveguide Device>

Figure 14:
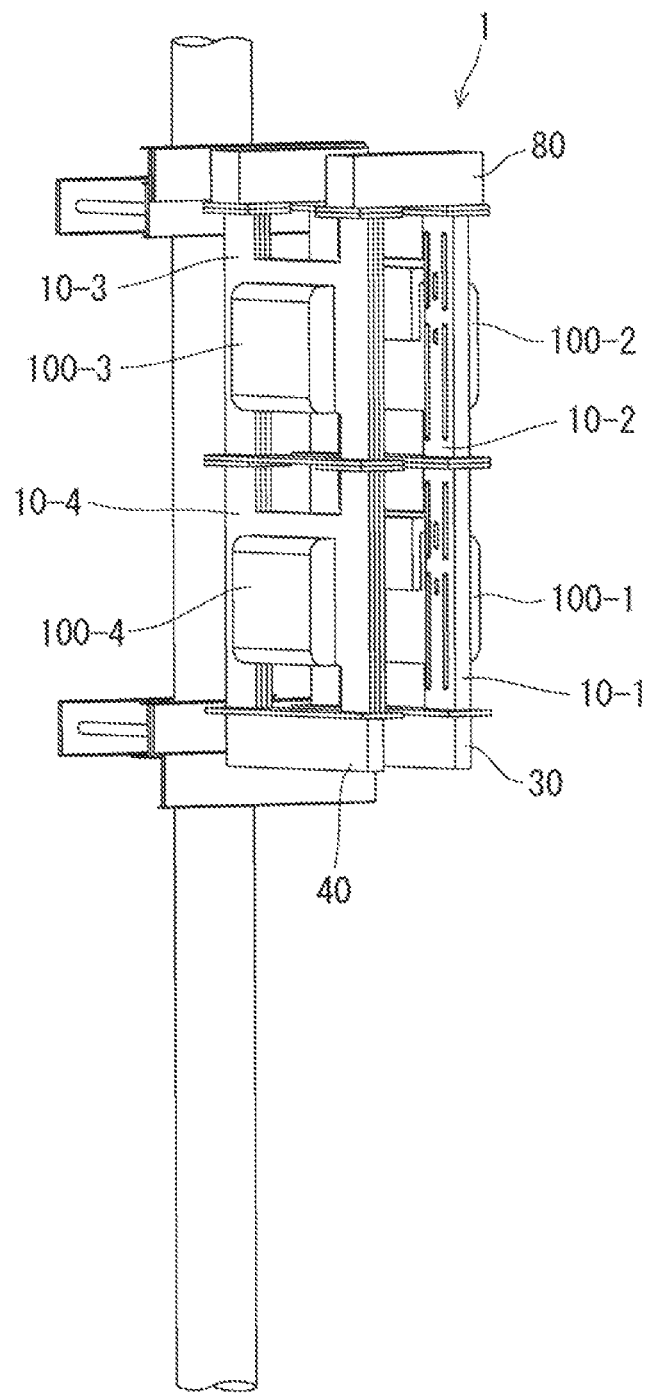
FIG. 14 is a diagram illustrating an external configuration example of a transmission/reception device including a waveguide device and a transmission/reception processing unit connected to the waveguide device according to an eighth example embodiment.
Figure 15:
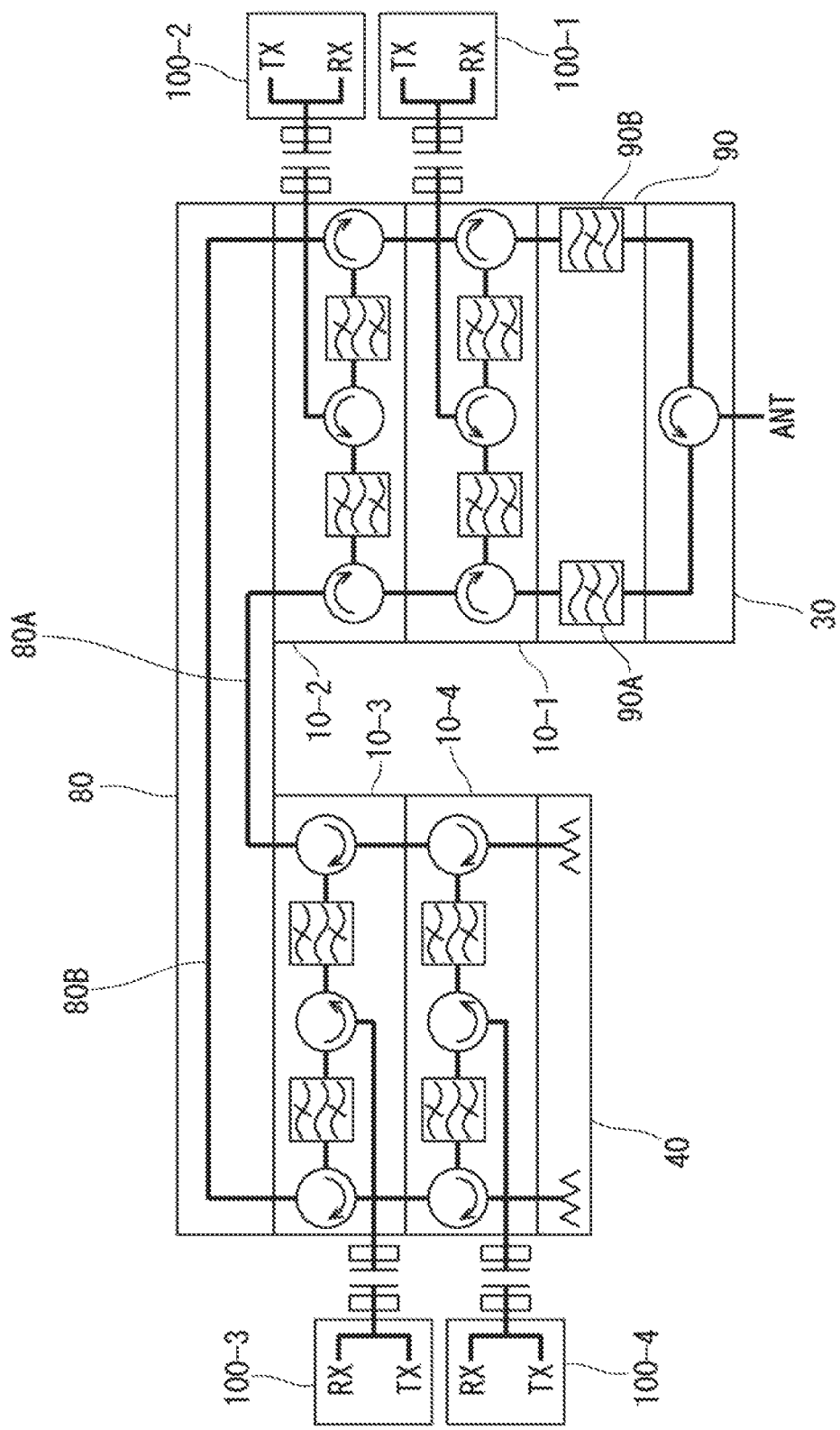
FIG. 15 is a diagram illustrating one example of an internal configuration of the transmission/reception device including the waveguide device and the transmission/reception processing unit connected to the waveguide device according to the eighth example embodiment.

FIG. 14 is a diagram illustrating an external configuration example of a transmission/reception device including a waveguide device and a transmission/reception processing unit connected to the waveguide device according to the eighth example embodiment. FIG. 15 is a diagram illustrating one example of an internal configuration of the transmission/reception device including the waveguide device and the transmission/reception processing unit connected to the waveguide device according to the eighth example embodiment.

As illustrated in FIG. 14, a waveguide device 1 according to the eighth example embodiment includes an antenna connection unit 30, four waveguide units 10-1, 10-2, 10-3, and 10-4, a terminal unit 40, and an inter-unit connection unit 80. Note that, herein, the number of the waveguide units 10 included in the waveguide unit 1 is four, which is not limited thereto.

The waveguide units 10-1, 10-2, 10-3, and 10-4 each have a flat plate shape. Then, the waveguide unit 10-1 and the waveguide unit 10-4 are disposed in such a way that a surface of the waveguide unit 10-1 on a side opposite to a surface to which a transmission/reception processing unit 100-1 is attached faces a surface of the waveguide unit 10-4 on a side opposite to a surface to which a transmission/reception processing unit 100-4 is attached. Similarly, the waveguide unit 10-2 and the waveguide unit 10-3 are disposed in such a way that a surface of the waveguide unit 10-2 on a side opposite to a surface to which a transmission/reception processing unit 100-2 is attached faces a surface of the waveguide unit 10-4 on a side opposite to a surface to which a transmission/reception processing unit 100-3 is attached.

Then, the inter-unit connection unit 80 is bridged between the waveguide unit 10-2 and the waveguide unit 10-3, and connects the waveguide unit 10-2 to the waveguide unit 10-3. Specifically, the inter-unit connection unit 80 includes a waveguide 80A that connects a transmission wave output port 13 of the waveguide unit 10-3 to a transmission wave input port 12 of the waveguide unit 10-2, and a waveguide 80B that connects a reception wave output port 15 of the waveguide unit 10-2 to a reception wave input port 14 of the waveguide unit 10-3.

As described above, according to the eighth example embodiment, a transmission/reception device configured to be bent into a U-shape near a central portion can be achieved by providing the waveguide device 1 with the inter-unit connection unit 80. In this way, a compact layout of the transmission/reception device can be achieved.

Note that, as illustrated in FIG. 15, the waveguide device 1 according to the eighth example embodiment may include a band-stop filter unit 90. The band-stop filter unit 90 includes a band-stop filter 90A and a band-stop filter 90B. The band-stop filter 90A and the band-stop filter 90B are disposed in a transmission wave path and a reception wave path, respectively.

In other words, in the waveguide device 1, there may be a case where an interference occurs between a transmission signal and a reception signal due to a transmission frequency and a reception frequency being close to each other between different waveguide units. In such a case, the band-stop filter unit 90 may be disposed in the waveguide device 1 according to the eighth example embodiment in order to increase an amount of attenuation of an interference signal. Note that the band-stop filter unit 90 may be disposed in the waveguide device 1 according to the third example embodiment, or may be disposed in each of the waveguide device 1 and the waveguide device 2 according to the fourth example embodiment.

Other Example Embodiment

Each waveguide described in the first example embodiment to the eighth example embodiment described above may be formed of a waveguide tube. In this way, a loss of a guided signal (radio wave) can be reduced. Further, each waveguide described in the first example embodiment to the eighth example embodiment may have a configuration other than a waveguide tube, and may be formed of a coaxial line or a microstrip line, for example.

Although the invention of the present application has been described above with reference to the example embodiments, the invention of the present application is not limited to the above-described example embodiments. Various modifications that can be understood by those skilled in the art can be made to the configuration and the details of the invention of the present application within the scope of the invention.

A part or the whole of the above-described example embodiments may also be described as in Supplementary Notes below, which is not limited thereto.

(Supplementary Note 1)

A waveguide unit configured to be connectable to each of a transmission/reception processing unit being a first connected object unit, a second connected object unit, and a third connected object unit, the waveguide unit including:

a first interface unit configured to receive a first transmission radio wave having a first transmission frequency being output from the transmission/reception processing unit, and output a first reception radio wave having a first reception frequency to the transmission/reception processing unit;

a first transmission wave input port configured to receive a second transmission radio wave having a second transmission frequency being output from the third connected object unit when the third connected object unit is another waveguide unit;

a first transmission wave output port configured to output the first transmission radio wave and the second transmission radio wave to the second connected object unit;

a first reception wave input port configured to receive a multiplex reception radio wave from the second connected object unit;

a first reception wave output port configured to output a second reception radio wave having a second reception frequency included in the multiplex reception radio wave to the third connected object unit; and a first reception band-pass filter configured to pass the first reception radio wave of the multiplex reception radio wave being input to the first reception wave input port and output the first reception radio wave toward the first interface unit, and reflect the second reception radio wave and output the second reception radio wave toward the first reception wave output port.

(Supplementary Note 2)

The waveguide unit according to Supplementary Note 1, wherein the first reception wave input port is disposed away from the first transmission wave output port, and the first reception wave output port is disposed away from the first transmission wave input port.

(Supplementary Note 3)

The waveguide unit according to Supplementary Note 1 or 2, further including:

a first waveguide configured to connect the first transmission wave input port to the first transmission wave output port;

a second waveguide configured to dispose away from the first waveguide and connect the first reception wave input port to the first reception wave output port; and a connection unit that includes the first reception band-pass filter, and is configured to connect each of an intermediate portion of the first waveguide and an intermediate portion of the second waveguide to the first interface unit, output the first reception radio wave passed through the first reception band-pass filter toward the first interface unit, and output, toward the first transmission wave output port, a multiplex transmission radio wave acquired by multiplexing the first transmission radio wave being input to the first interface unit and the second transmission radio wave being reflected by the first reception band-pass filter.

(Supplementary Note 4)

The waveguide unit according to Supplementary Note 3, wherein the connection unit further includes a first circulator, a second circulator disposed in an intermediate portion of the first waveguide, and a third circulator disposed in an intermediate portion of the second waveguide, a third waveguide configured to connect the first circulator to the first interface unit;

a fourth waveguide configured to connect the first circulator to the third circulator via the first reception band-pass filter, receive the multiplex reception radio wave from the third circulator, output the second reception radio wave being reflected by the first reception band-pass filter to the third circulator, and also output the first reception radio wave passed through the first reception band-pass filter to the first circulator, a transmission band-pass filter configured to reflect except for the first transmission radio wave, and pass the first transmission radio wave, and a fifth waveguide configured to connect the first circulator to the second circulator via the transmission band-pass filter, receive the second transmission radio wave from the second circulator, output the second transmission radio wave being reflected by the transmission band-pass filter to the second circulator, and also output the first transmission radio wave passed through the transmission band-pass filter to the second circulator.

(Supplementary Note 5)

The waveguide unit according to Supplementary Note 4, wherein the first reception band-pass filter and the transmission band-pass filter constitute an exchange unit being removable from the waveguide unit.

(Supplementary Note 6)

The waveguide unit according to any one of Supplementary Notes 3 to 5, wherein the transmission/reception processing unit includes a first partial unit configured to output the first transmission radio wave and also receive the first reception radio wave, and a second partial unit configured to receive a third reception radio wave having a third reception frequency, and the waveguide unit further includes a second interface unit that is different from the first interface unit connected to the first partial unit, and is connected to the second partial unit, a second reception wave input port configured to receive another multiplex reception radio wave from the second connected object unit, a second reception wave output port configured to output a fourth reception radio wave having a fourth reception frequency included in the another multiplex reception radio wave to the third connected object unit, a second reception band-pass filter configured to reflect the another multiplex reception radio wave being input to the second reception wave input port except for the third reception radio wave, and pass the third reception radio wave, a fourth circulator, a sixth waveguide configured to connect the second reception wave input port to the second reception wave output port via the fourth circulator, and a seventh waveguide configured to connect the second interface unit to the fourth circulator via the second reception band-pass filter, receive the another multiplex reception radio wave from the fourth circulator, output the third reception radio wave passed through the second reception band-pass filter to the second interface unit, and also output the fourth reception radio wave being reflected by the second reception band-pass filter to the fourth circulator.

(Supplementary Note 7)

The waveguide unit according to Supplementary Note 3, wherein the transmission/reception processing unit includes a transmission processing unit and a first reception processing unit independent of the transmission processing unit, the first interface unit includes a transmission interface unit connected to the transmission processing unit and a reception interface unit connected to the first reception processing unit, and the connection unit further includes a fifth circulator disposed in an intermediate portion of the first waveguide and a sixth circulator disposed in an intermediate portion of the second waveguide, an eighth waveguide configured to connect the sixth circulator to the reception interface unit via the first reception band-pass filter, receive the multiplex reception radio wave from the sixth circulator, output a reflected wave being reflected by the first reception band-pass filter to the sixth circulator, and also output the first reception radio wave passed through the first reception band-pass filter to the reception interface unit, a transmission band-pass filter configured to reflect except for the first transmission radio wave, and pass the first transmission radio wave, and a ninth waveguide configured to connect the fifth circulator to the transmission interface unit via the transmission band-pass filter, receive the second transmission radio wave from the fifth circulator, output the second transmission radio wave being reflected by the transmission band-pass filter to the fifth circulator, and also output the first transmission radio wave passed through the transmission band-pass filter to the fifth circulator.

(Supplementary Note 8)

The waveguide unit according to Supplementary Note 7, wherein the transmission processing unit further includes a second reception unit configured to receive a third reception radio wave having a third reception frequency, and the waveguide unit further includes
a third interface unit connected to the second reception unit,
a second reception wave input port configured to receive another multiplex reception radio wave from the second connected object unit,
a second reception wave output port configured to output a fourth reception radio wave having a fourth reception frequency included in the another multiplex reception radio wave to the third connected object unit,
a second reception band-pass filter configured to reflect the another multiplex reception radio wave being input to the second reception wave input port except for the third reception radio wave, and pass the third reception radio wave,
a fourth circulator,
a sixth waveguide configured to connect the second reception wave input port to the second reception wave output port via the fourth circulator, and
a seventh waveguide configured to connect the third interface unit to the fourth circulator via the second reception band-pass filter, receive the another multiplex reception radio wave from the fourth circulator, output the third reception radio wave passed through the second reception band-pass filter to the third interface unit, and also output the fourth reception radio wave being reflected by the second reception band-pass filter to the fourth circulator.

(Supplementary Note 9)
A waveguide device used by being connected to an antenna, the waveguide device including:
a second waveguide unit configured to be connectable to a second transmission/reception processing unit, and a first waveguide unit configured to be connectable to a first transmission/reception processing unit and connected to the second waveguide unit and a connected object unit, wherein
the first waveguide unit includes
a first interface unit configured to receive a first transmission radio wave having a first transmission frequency being output from the first transmission/reception processing unit, and output a first reception radio wave having a first reception frequency to the first transmission/reception processing unit,
a first transmission wave input port configured to receive a second transmission radio wave having a second transmission frequency being output from the second waveguide unit,
a first transmission wave output port configured to output a multiplex transmission radio wave of the first transmission radio wave and the second transmission radio wave to the connected object unit,
a first reception wave input port configured to receive a multiplex reception radio wave being received by the antenna from the connected object unit,
a first reception wave output port configured to output a second reception radio wave having a second reception frequency included in the multiplex reception radio wave to the second waveguide unit, and
a first reception band-pass filter configured to pass the first reception radio wave of the multiplex reception radio wave being input to the first reception wave input port and output the first reception radio wave toward the first interface unit, and reflect the second reception radio wave and output the second reception radio wave toward the first reception wave output port.

(Supplementary Note 10)
The waveguide device according to Supplementary Note 9, wherein
the first reception wave input port is disposed away from the first transmission wave output port, and
the first reception wave output port is disposed away from the first transmission wave input port.

(Supplementary Note 11)
The waveguide device according to Supplementary Note 9 or 10, wherein
the connected object unit is an antenna connection unit configured to connect the first waveguide unit to the antenna, and
the antenna connection unit includes
an antenna connection port configured to receive the multiplex reception radio wave received by the antenna, and output the multiplex transmission radio wave toward the antenna,
a multiplex transmission wave input port configured to receive the multiplex transmission radio wave from the first waveguide unit,
a multiplex reception wave output port configured to output a multiplex reception radio wave being input to the antenna connection port to the first waveguide unit, and
a transmission/reception circulator configured to output a multiplex reception radio wave being input to the antenna connection port to the multiplex reception wave output port, and output a multiplex transmission radio wave being input from the multiplex transmission wave input port to the antenna connection port.

(Supplementary Note 12)
The waveguide device according to any one of Supplementary Notes 9 to 11, wherein
the first waveguide unit and the second waveguide unit each have a flat plate shape,
the first waveguide unit and the second waveguide unit are disposed in such a way that a surface of the first waveguide unit on a side opposite to a surface to which the first transmission/reception processing unit is attached faces a surface of the second waveguide unit on a side opposite to a surface to which the second transmission/reception processing unit is attached, and
the waveguide device further includes an inter-unit connection unit configured to be bridged between the first waveguide unit and the second waveguide unit, and connect the first waveguide unit to the second waveguide unit.

(Supplementary Note 13)
The waveguide device according to Supplementary Note 12, wherein
the inter-unit connection unit includes a waveguide configured to connect a transmission wave output port of the second waveguide unit to the first transmission wave input port of the first waveguide unit, and a waveguide configured to connect the first reception wave output port of the first waveguide unit to a reception wave input port of the second waveguide unit.

(Supplementary Note 14)
An opposed-side waveguide device used by being connected to an opposed antenna disposed in such a way as to be opposed to the antenna connected to the waveguide device according to Supplementary Note 9, the opposed-side waveguide device including:
a third waveguide unit configured to be connectable to a third transmission/reception processing unit being a communication partner of the first transmission/reception processing unit; and a fourth waveguide unit configured to be connectable to a fourth transmission/reception processing unit being a communication partner of the second transmission/reception processing unit, wherein the third waveguide unit and the fourth waveguide unit are connected in series in order of the fourth waveguide unit and the third waveguide unit in order closer to the opposed antenna side.

(Supplementary Note 15)

A connection method of a plurality of waveguide units in a first waveguide device used by being connected to a first antenna and a second waveguide device used by being connected to a second antenna disposed in such a way as to be opposed to the first antenna, wherein the first waveguide device includes a second waveguide unit configured to be connectable to a second transmission/reception processing unit, and a first waveguide unit configured to be connectable to a first transmission/reception processing unit and connected to the second waveguide unit and a connected object unit, the first waveguide unit includes a first interface unit configured to receive a first transmission radio wave having a first transmission frequency being output from the first transmission/reception processing unit, and output a first reception radio wave having a first reception frequency to the first transmission/reception processing unit, a first transmission wave input port configured to receive a second transmission radio wave having a second transmission frequency being output from the second waveguide unit, a first transmission wave output port configured to output a multiplex transmission radio wave of the first transmission radio wave and the second transmission radio wave to the connected object unit, a first reception wave input port configured to receive a multiplex reception radio wave being received by the first antenna from the connected object unit, a first reception wave output port configured to output a second reception radio wave having a second reception frequency included in the multiplex reception radio wave to the second waveguide unit, a first waveguide configured to connect the first transmission wave input port to the first transmission wave output port, a second waveguide configured to dispose away from the first waveguide that connects the first reception wave input port to the first reception wave output port, and a first reception band-pass filter configured to pass the first reception radio wave of the multiplex reception radio wave being input to the first reception wave input port and output the first reception radio wave toward the first interface unit, and, on the other hand, reflect the second reception radio wave and output the second reception radio wave toward the first reception wave output port, the second waveguide device includes a third waveguide unit configured to be connectable to a third transmission/reception processing unit being a communication partner of the first transmission/reception processing unit, and a fourth waveguide unit configured to be connectable to a fourth transmission/reception processing unit being a communication partner of the second transmission/reception processing unit, in the first waveguide device, the first waveguide unit and the second waveguide unit are connected in series in order of the first waveguide unit and the second waveguide unit in order closer to the first antenna side, and in the second waveguide device, the third waveguide unit and the fourth waveguide unit are connected in series in order of the fourth waveguide unit and the third waveguide unit in order closer to the second antenna side.

REFERENCE SIGNS LIST 1, 2 WAVEGUIDE DEVICE
10, 20, 50, 60, 70 WAVEGUIDE UNIT
11, 51, 61, 71 INTERFACE UNIT
12, 52 TRANSMISSION WAVE INPUT PORT
13, 53 TRANSMISSION WAVE OUTPUT PORT
14, 54, 62, 72 RECEPTION WAVE INPUT PORT
15, 55, 63, 73 RECEPTION WAVE OUTPUT PORT
16, 56C, 64, 74 RECEPTION BAND-PASS FILTER
17, 18, 19D, 19E, 19G, 56D, 56F, 57, 58, 66, 67, 76, 77 WAVEGUIDE
19, 56 CONNECTION UNIT
19A, 19B, 19C, 56A, 56B, 65, 75 CIRCULATOR
19F, 56E TRANSMISSION BAND-PASS FILTER
30 ANTENNA CONNECTION UNIT
30A ANTENNA CONNECTION PORT
30B MULTIPLEX TRANSMISSION WAVE INPUT PORT
30C MULTIPLEX RECEPTION WAVE OUTPUT PORT
30D TRANSMISSION/RECEPTION CIRCULATOR
35 ANTENNA CONNECTION UNIT
35A ANTENNA CONNECTION PORT
35B MULTIPLEX RECEPTION WAVE OUTPUT PORT
40 TERMINAL UNIT
40A, 40B TERMINATION RESISTOR
51A TRANSMISSION INTERFACE UNIT
51B RECEPTION INTERFACE UNIT
80 INTER-UNIT CONNECTION UNIT
80A, 80B WAVEGUIDE
90 BAND-STOP FILTER UNIT
90A, 90B BAND-STOP FILTER
100, 110, 130, 140, 200 TRANSMISSION/RECEPTION PROCESSING UNIT
100A INTERFACE UNIT
111 TRANSMISSION INTERFACE UNIT
112 RECEPTION INTERFACE UNIT
130A, 130B INTERFACE UNIT
141, 142, 143 INTERFACE UNIT

The invention claimed is:

1. A waveguide unit configured to be connectable to each of a transmission/reception processing unit being a first connected object unit, a second connected object unit, and a third connected object unit, the waveguide unit comprising:

a first interface unit configured to receive a first transmission radio wave having a first transmission frequency being output from the transmission/reception processing unit, and output a first reception radio wave having a first reception frequency to the transmission/reception processing unit;

a first transmission wave input port configured to receive a second transmission radio wave having a second transmission frequency being output from the third connected object unit when the third connected object unit is another waveguide unit;

a first transmission wave output port configured to output the first transmission radio wave and the second transmission radio wave to the second connected object unit;

a first reception wave input port configured to receive a multiplex reception radio wave from the second connected object unit;

a first reception wave output port configured to output a second reception radio wave having a second reception frequency included in the multiplex reception radio wave to the third connected object unit; and a first reception band-pass filter configured to pass the first reception radio wave of the multiplex reception radio wave being input to the first reception wave input port and output the first reception radio wave toward the first interface unit, and reflect the second reception radio wave and output the second reception radio wave toward the first reception wave output port.

2. The waveguide unit according to claim 1, wherein the first reception wave input port is disposed away from the first transmission wave output port, and
the first reception wave output port is disposed away from the first transmission wave input port.

3. The waveguide unit according to claim 1, further comprising:
 a first waveguide configured to connect the first transmission wave input port to the first transmission wave output port;
 a second waveguide configured to dispose away from the first waveguide and connect the first reception wave input port to the first reception wave output port; and
 a connection unit that includes the first reception band-pass filter, and is configured to connect each of an intermediate portion of the first waveguide and an intermediate portion of the second waveguide to the first interface unit, output the first reception radio wave passed through the first reception band-pass filter toward the first interface unit, and output, toward the first transmission wave output port, a multiplex transmission radio wave acquired by multiplexing the first transmission radio wave being input to the first interface unit and the second transmission radio wave being reflected by the first reception band-pass filter.

4. The waveguide unit according to claim 3, wherein the connection unit further includes
 a first circulator, a second circulator disposed in an intermediate portion of the first waveguide, and a third circulator disposed in an intermediate portion of the second waveguide,
 a third waveguide configured to connect the first circulator to the first interface unit;
 a fourth waveguide configured to connect the first circulator to the third circulator via the first reception band-pass filter, receive the multiplex reception radio wave from the third circulator, output the second reception radio wave being reflected by the first reception band-pass filter to the third circulator, and also output the first reception radio wave passed through the first reception band-pass filter to the first circulator,
 a transmission band-pass filter configured to reflect except for the first transmission radio wave, and pass the first transmission radio wave, and
 a fifth waveguide configured to connect the first circulator to the second circulator via the transmission band-pass filter, receive the second transmission radio wave from the second circulator, output the second transmission radio wave being reflected by the transmission band-pass filter to the second circulator, and also output the first transmission radio wave passed through the transmission band-pass filter to the second circulator.

5. The waveguide unit according to claim 4, wherein the first reception band-pass filter and the transmission band-pass filter constitute an exchange unit being removable from the waveguide unit.

6. The waveguide unit according to claim 3, wherein the transmission/reception processing unit includes a first partial unit configured to output the first transmission radio wave and also receive the first reception radio wave, and a second partial unit configured to receive a third reception radio wave having a third reception frequency, and
the waveguide unit further comprises:
 a second interface unit that is different from the first interface unit connected to the first partial unit, and is connected to the second partial unit;
 a second reception wave input port configured to receive another multiplex reception radio wave from the second connected object unit;
 a second reception wave output port configured to output a fourth reception radio wave having a fourth reception frequency included in the another multiplex reception radio wave to the third connected object unit;
 a second reception band-pass filter configured to reflect the another multiplex reception radio wave being input to the second reception wave input port except for the third reception radio wave, and pass the third reception radio wave;
 a fourth circulator;
 a sixth waveguide configured to connect the second reception wave input port to the second reception wave output port via the fourth circulator; and
 a seventh waveguide configured to connect the second interface unit to the fourth circulator via the second reception band-pass filter, receive the another multiplex reception radio wave from the fourth circulator, output the third reception radio wave passed through the second reception band-pass filter to the second interface unit, and also output the fourth reception radio wave being reflected by the second reception band-pass filter to the fourth circulator.

7. The waveguide unit according to claim 3, wherein the transmission/reception processing unit includes a transmission processing unit and a first reception processing unit independent of the transmission processing unit,
the first interface unit includes a transmission interface unit connected to the transmission processing unit and a reception interface unit connected to the first reception processing unit, and
the connection unit further includes
 a fifth circulator disposed in an intermediate portion of the first waveguide and a sixth circulator disposed in an intermediate portion of the second waveguide,
 an eighth waveguide configured to connect the sixth circulator to the reception interface unit via the first reception band-pass filter, receive the multiplex reception radio wave from the sixth circulator, output a reflected wave being reflected by the first reception band-pass filter to the sixth circulator, and also output the first reception radio wave passed through the first reception band-pass filter to the reception interface unit,
 a transmission band-pass filter configured to reflect except for the first transmission radio wave, and pass the first transmission radio wave, and
 a ninth waveguide configured to connect the fifth circulator to the transmission interface unit via the transmission band-pass filter, receive the second transmission radio wave from the fifth circulator, output the second transmission radio wave being reflected by the transmission band-pass filter to the fifth circulator, and also output the first transmission radio wave passed through the transmission band-pass filter to the fifth circulator.

8. The waveguide unit according to claim 7, wherein the transmission processing unit further includes a second reception unit configured to receive a third reception radio wave having a third reception frequency, and the waveguide unit further comprises:
 a third interface unit connected to the second reception unit;
 a second reception wave input port configured to receive another multiplex reception radio wave from the second connected object unit;
 a second reception wave output port configured to output a fourth reception radio wave having a fourth reception frequency included in the another multiplex reception radio wave to the third connected object unit;
 a second reception band-pass filter configured to reflect the another multiplex reception radio wave being input to the second reception wave input port except for the third reception radio wave, and pass the third reception radio wave;
 a fourth circulator;
 a sixth waveguide configured to connect the second reception wave input port to the second reception wave output port via the fourth circulator; and
 a seventh waveguide configured to connect the third interface unit to the fourth circulator via the second reception band-pass filter, receive the another multiplex reception radio wave from the fourth circulator, output the third reception radio wave passed through the second reception band-pass filter to the third interface unit, and also output the fourth reception radio wave being reflected by the second reception band-pass filter to the fourth circulator.

9. A waveguide device used by being connected to an antenna, the waveguide device comprising:
 a second waveguide unit configured to be connectable to a second transmission/reception processing unit, and a first waveguide unit configured to be connectable to a first transmission/reception processing unit and connected to the second waveguide unit and a connected object unit, wherein
 the first waveguide unit includes
  a first interface unit configured to receive a first transmission radio wave having a first transmission frequency being output from the first transmission/reception processing unit, and output a first reception radio wave having a first reception frequency to the first transmission/reception processing unit,
  a first transmission wave input port configured to receive a second transmission radio wave having a second transmission frequency being output from the second waveguide unit,
  a first transmission wave output port configured to output a multiplex transmission radio wave of the first transmission radio wave and the second transmission radio wave to the connected object unit,
  a first reception wave input port configured to receive a multiplex reception radio wave being received by the antenna from the connected object unit,
  a first reception wave output port configured to output a second reception radio wave having a second reception frequency included in the multiplex reception radio wave to the second waveguide unit, and
  a first reception band-pass filter configured to pass the first reception radio wave of the multiplex reception radio wave being input to the first reception wave input port and output the first reception radio wave toward the first interface unit, and reflect the second reception radio wave and output the second reception radio wave toward the first reception wave output port.

10. The waveguide device according to claim 9, wherein the first reception wave input port is disposed away from the first transmission wave output port, and the first reception wave output port is disposed away from the first transmission wave input port.

11. The waveguide device according to claim 9 or 10, wherein
 the connected object unit is an antenna connection unit configured to connect the first waveguide unit to the antenna, and
 the antenna connection unit includes
  an antenna connection port configured to receive the multiplex reception radio wave received by the antenna, and output the multiplex transmission radio wave toward the antenna,
  a multiplex transmission wave input port configured to receive the multiplex transmission radio wave from the first waveguide unit,
  a multiplex reception wave output port configured to output a multiplex reception radio wave being input to the antenna connection port to the first waveguide unit, and
  a transmission/reception circulator configured to output a multiplex reception radio wave being input to the antenna connection port to the multiplex reception wave output port, and output a multiplex transmission radio wave being input from the multiplex transmission wave input port to the antenna connection port.

12. The waveguide device according to claim 9, wherein the first waveguide unit and the second waveguide unit each have a flat plate shape,
 the first waveguide unit and the second waveguide unit are disposed in such a way that a surface of the first waveguide unit on a side opposite to a surface to which the first transmission/reception processing unit is attached faces a surface of the second waveguide unit on a side opposite to a surface to which the second transmission/reception processing unit is attached, and
 the waveguide device further includes an inter-unit connection unit configured to be bridged between the first waveguide unit and the second waveguide unit, and connect the first waveguide unit to the second waveguide unit.

13. The waveguide device according to claim 12, wherein the inter-unit connection unit includes a waveguide configured to connect a transmission wave output port of the second waveguide unit to the first transmission wave input port of the first waveguide unit, and a waveguide configured to connect the first reception wave output port of the first waveguide unit to a reception wave input port of the second waveguide unit.

14. An opposed-side waveguide device used by being connected to an opposed antenna disposed in such a way as to be opposed to the antenna connected to the waveguide device according to claim 9, the opposed-side waveguide device comprising:

a third waveguide unit configured to be connectable to a third transmission/reception processing unit being a communication partner of the first transmission/reception processing unit; and a fourth waveguide unit configured to be connectable to a fourth transmission/reception processing unit being a communication partner of the second transmission/reception processing unit, wherein the third waveguide unit and the fourth waveguide unit are connected in series in order of the fourth waveguide unit and the third waveguide unit in order closer to the opposed antenna side.

15. A connection method of a plurality of waveguide units in a first waveguide device used by being connected to a first antenna and a second waveguide device used by being connected to a second antenna disposed in such a way as to be opposed to the first antenna, wherein the first waveguide device includes a second waveguide unit configured to be connectable to a second transmission/reception processing unit, and a first waveguide unit configured to be connectable to a first transmission/reception processing unit and connected to the second waveguide unit and a connected object unit, the first waveguide unit includes
- a first interface unit configured to receive a first transmission radio wave having a first transmission frequency being output from the first transmission/reception processing unit, and output a first reception radio wave having a first reception frequency to the first transmission/reception processing unit,
- a first transmission wave input port configured to receive a second transmission radio wave having a second transmission frequency being output from the second waveguide unit,
- a first transmission wave output port configured to output a multiplex transmission radio wave of the first transmission radio wave and the second transmission radio wave to the connected object unit,
- a first reception wave input port configured to receive a multiplex reception radio wave being received by the first antenna from the connected object unit,
- a first reception wave output port configured to output a second reception radio wave having a second reception frequency included in the multiplex reception radio wave to the second waveguide unit,
- a first waveguide configured to connect the first transmission wave input port to the first transmission wave output port,
- a second waveguide configured to dispose away from the first waveguide that connects the first reception wave input port to the first reception wave output port, and
- a first reception band-pass filter configured to pass the first reception radio wave of the multiplex reception radio wave being input to the first reception wave input port and output the first reception radio wave toward the first interface unit, and, on the other hand, reflect the second reception radio wave and output the second reception radio wave toward the first reception wave output port, the second waveguide device includes a third waveguide unit configured to be connectable to a third transmission/reception processing unit being a communication partner of the first transmission/reception processing unit, and a fourth waveguide unit configured to be connectable to a fourth transmission/reception processing unit being a communication partner of the second transmission/reception processing unit, in the first waveguide device, the first waveguide unit and the second waveguide unit are connected in series in order of the first waveguide unit and the second waveguide unit in order closer to the first antenna side, and in the second waveguide device, the third waveguide unit and the fourth waveguide unit are connected in series in order of the fourth waveguide unit and the third waveguide unit in order closer to the second antenna side.

* * * * *